(12) United States Patent
Tellado et al.

(10) Patent No.: US 6,424,681 B1
(45) Date of Patent: Jul. 23, 2002

(54) PEAK TO AVERAGE POWER RATIO REDUCTION

(75) Inventors: Jose Tellado, Mountain View; John M. Cioffi, Cupertino, both of CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 0 days.

(21) Appl. No.: 09/062,867

(22) Filed: Apr. 20, 1998

(51) Int. Cl.$^7$ ............................................. H04L 25/03

(52) U.S. Cl. ..................... 375/296; 375/295; 375/297; 375/298; 375/316

(58) Field of Search ................................. 375/296, 297, 375/298, 295, 316; 330/129

(56) References Cited

U.S. PATENT DOCUMENTS

| | | | |
|---|---|---|---|
| 5,268,938 A | | 12/1993 | Feig et al. |
| 5,282,222 A | | 1/1994 | Fattouche et al. |
| 5,285,474 A | | 2/1994 | Chow et al. |
| 5,302,914 A | * | 4/1994 | Arntz et al. ................. 330/129 |
| 5,598,436 A | | 1/1997 | Brajal et al. |
| 5,621,762 A | * | 4/1997 | Miller et al. ................. 375/298 |
| 5,835,536 A | * | 11/1998 | May et al. ................... 375/316 |
| 5,838,732 A | * | 11/1998 | Carney ........................ 375/297 |
| 6,125,103 A | | 9/2000 | Bäuml et al. ................ 370/203 |
| 6,130,918 A | * | 10/2000 | Humphrey et al. ......... 375/295 |
| 6,175,551 B1 | | 1/2001 | Awater et al. ............... 370/210 |

FOREIGN PATENT DOCUMENTS

| | | | |
|---|---|---|---|
| WO | WO 95/17049 | 6/1995 | |
| WO | WO 98/10567 | * 3/1998 | ........... H04L/27/26 |

OTHER PUBLICATIONS

Muller et al., A Comparison of Peak Power Reduction Schemes for OFDM, 1997, IEEE, Globecom '97, vol. 1, pp. 1–5.*

Mathias Friese, "OFDM Signals with Low Crest–Factor", Nov. 1997, Globecom, pp. 290–294.

(List continued on next page.)

*Primary Examiner*—Stephen Chin
*Assistant Examiner*—Shuwang Liu
(74) *Attorney, Agent, or Firm*—Beyer Weaver & Thomas LLP

(57) ABSTRACT

The present inventions provide methods and systems for reducing the peak to average power ratio of a multi-carrier signal. Reducing the peak to average power ratio of a signal ensures that amplifiers and transmitters are not saturated, causing loss of data. Further, reducing peak to average power ratios reduces the consumption of power during transmission. Peak to average power ratios are reduced by selecting a subset of a plurality of frequencies that make up a multi-carrier symbol. Peak reduction signals, carried at the subset of frequencies, are computed to reduce the PAR of the symbol. In one embodiment, a kernel is generated that has components in the subset of frequencies. The kernel is adjusted to negate one or more peaks in the multi-carrier symbol. The adjustment of the kernel creates a subset of signals of a plurality of signals centered at the plurality of frequencies. Negation of the peaks may be performed iteratively to remove any peaks produced during prior peak reduction operations.

40 Claims, 13 Drawing Sheets

OTHER PUBLICATIONS

Stefan Miller, et al., "A Comparison of Peak Power Reduction Schemes for OFDM", Nov. 1997, Globecom, pp. 1–5.

Alan Gatherer et al., "Controlling Clipping Probability in DMT Transmission", Nov. 1997, Askomar, pp. 578–584.

Jacky S. Chow et al., "Mitigating Clipping Noise in Multi-Carrier Systems", Jun. 1997, ICC, pp. 715–719.

S.H. Müller et al., "OFDM with Reduced Peak-to-Average Power Ratio by Optimum Combination of Partial Transmit Sequences", Feb. 27, 1997, Electronics Letters, vol. 33, No. 5, pp. 368–369.

M. Friese, "Multicarrier Modulation with Low Peak-to-Average Power Ratio", Apr. 11, 1996, Electronics Letters, vol. 32, No. 8, pp. 713–714.

Denis J.G. Mestdagh, "A Method to Reduce the Probability of Clipping in DMT-Based Transceivers", Oct. 1996, IEEE Transactions on Communications, vol. 44, No. 10, pp. 1234–1238.

D. Wulich, "Reduction of Peak to Mean Ratio of Multicarrier Modulation Using Cyclic Coding", Feb. 29, 1996, Electronics Letters, vol. 32, No. 5, pp. 432–433.

A.E. Jones et al., "Blockcoding Scheme for Reduction of Peak to Mean Envelope Power Ratio of Multicarrier Transmission Schemes", Dec. 8, 1994, vol. 30, No. 25, pp. 2098–2099.

\* cited by examiner

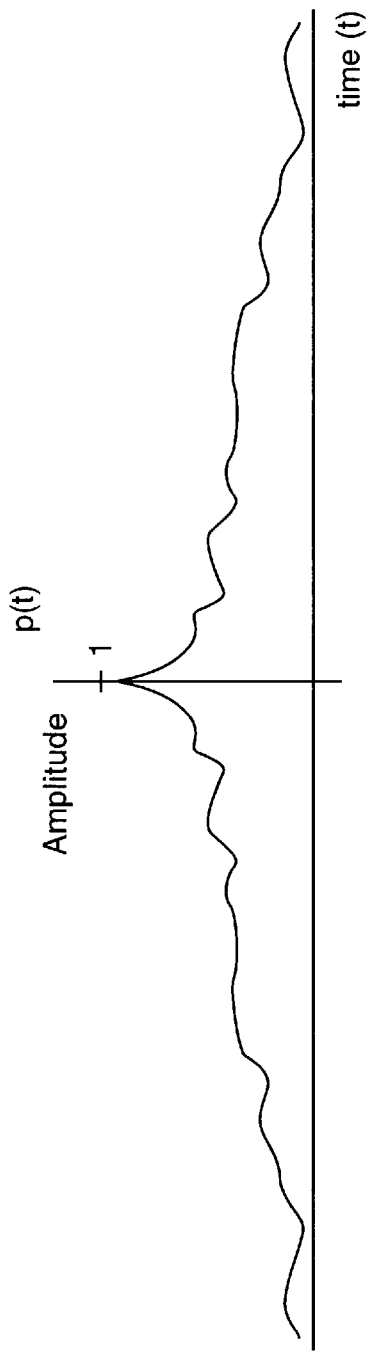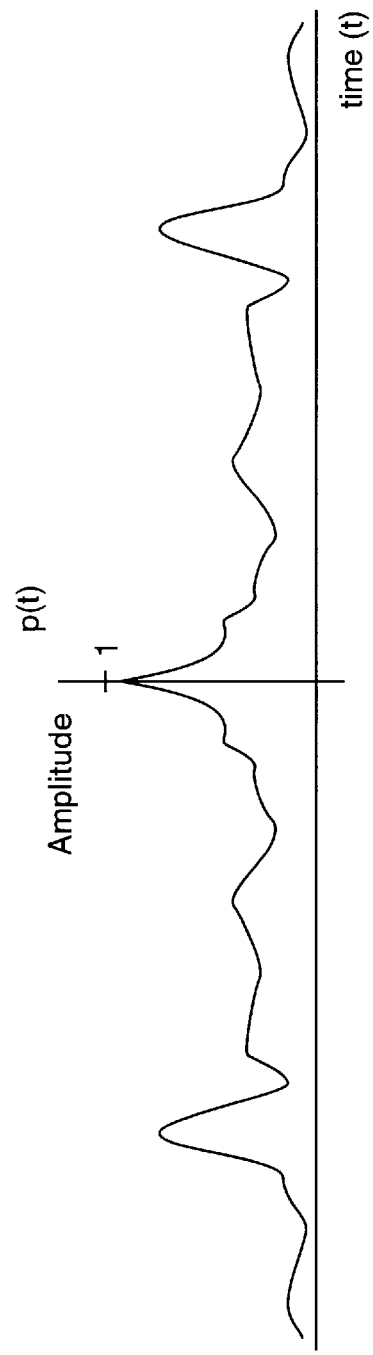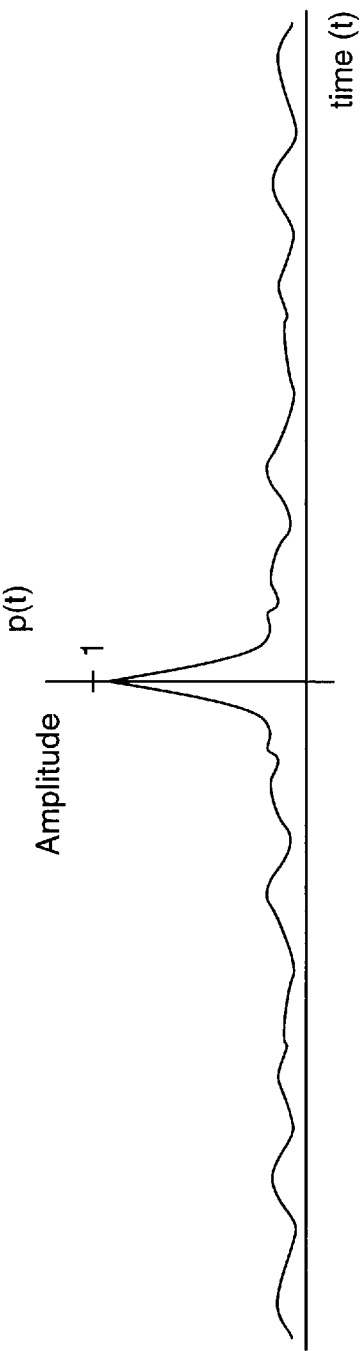
Fig. 10a
Fig. 10b
Fig. 10c

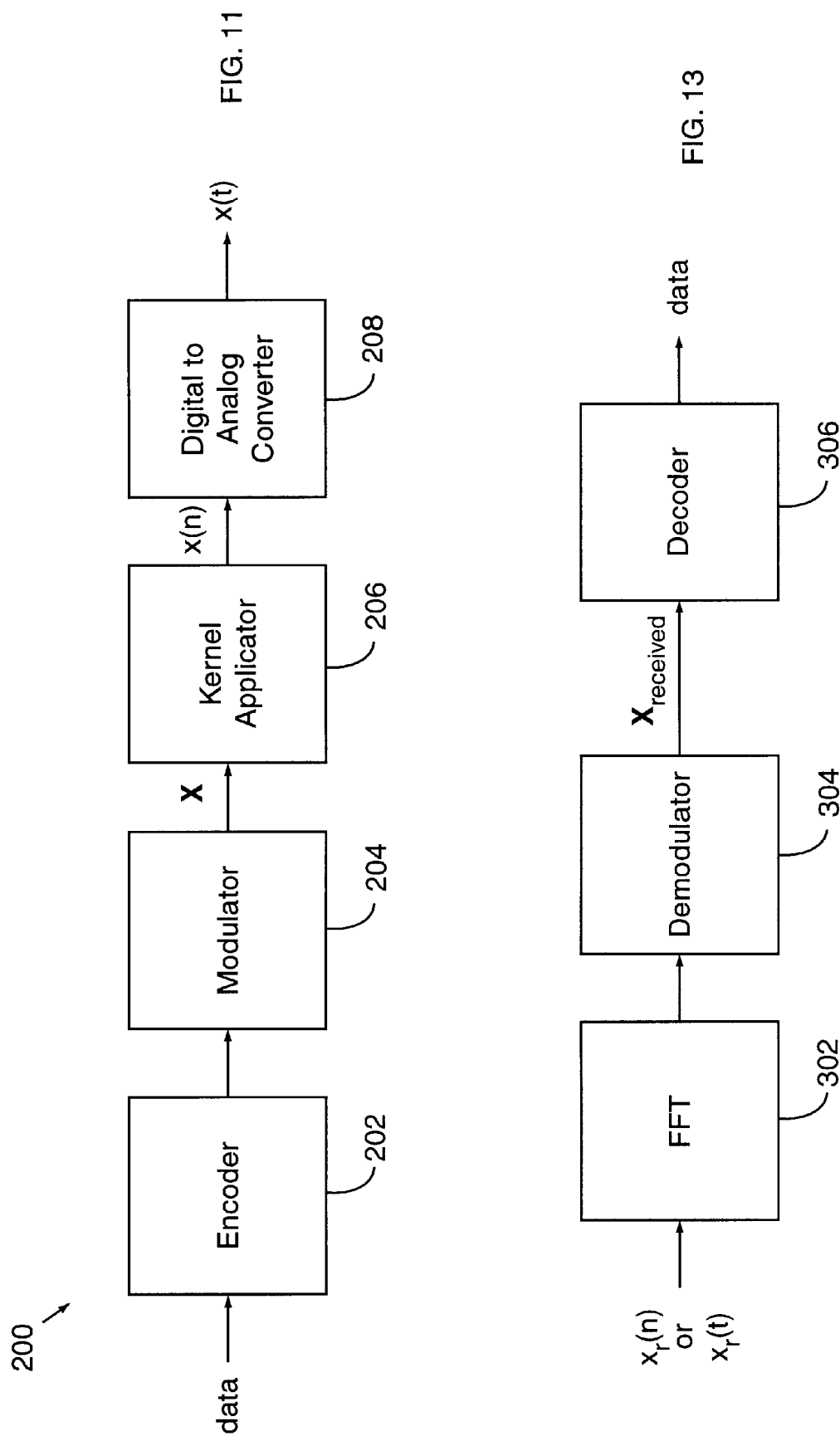

PEAK TO AVERAGE POWER RATIO REDUCTION

BACKGROUND OF THE INVENTION

This invention relates generally to communication systems. More specifically to reducing peak to average power ratios in multi-carrier communication systems.

In recent years multi-carrier communication systems have received more attention. Multi-carrier communication systems offer the promise of increased bandwidth combined with two-way communications.

However, several problems still remain to be solved to ensure the widespread use of multi-carrier communication systems. One concern is how to reduce the peak to average power ratio of a multi-carrier transmission.

Referring to FIG. 1, a multi-carrier transmission is composed of a number of independent signals. FIG. 1 is a frequency domain plot of several signals 10(1)–10(n). Each signal 10(1)–(n) is centered a different frequency f(1)–f(n). Often times the frequencies are equally spaced. apart. The frequencies are commonly referred to as carrier frequencies.

In most multi-carrier communication systems the signals 10(1)–(n) are combined together as a vector. An inverse fast fourier transform (IFFT) is usually performed on the vector to produce a discrete time domain signal which is converted to a continuous time domain signal and transmitted. FIG. 2 illustrates a continuous time domain representation of a typical output signal 30 of a multi-carrier transmitter.

Signal 30 contains a number of peaks 31–34. A problem with the output signal is that the peaks 31–34 often times exceeds the output capabilities of the transmitter. If the transmitter is only capable of transmitting at amplitudes of up to +/−10 dB, the peaks saturate the transmitter and the peaks are cutoff in the transmitted signal. Saturation causes the transmitted signal to lose a significant amount of information, which may or may not be corrected for by the receiver. Thus, it is important to reduce the peaks in order to maintain the integrity of the transmitted signal.

Reducing the peak to average power ratio of a signal requires that the number and magnitude of the peaks are reduced. There have been several attempts to reduce peak to average power ratios, although they are only successful to a certain extent.

The placement of the different signals 10(1)–(n) at different carrier frequencies f(1)–f(n) affects the shape of the output signal 30. One method randomly shuffles the phase of the signals 10(1)–10(n) at each carrier frequency f(1)–f(n). Random shuffling does not completely eliminate the problem, although randomizing has been shown to somewhat reduce the peak to average power ratio to an extent. Random shuffling also requires performing an additional IFFT. In addition to not completely reducing the peak to average power ratio to a practical point, that particular method also requires that additional information, side information, be sent along with the transmitted signal. In order for the receiver to be able to decode the transmitted signal the receiver must also know how the signals 10(1)–10(n) were randomized. Thus, the randomization scheme requires extra bandwidth to transmit the side information and does not effectively reduce the peak to average power ratio.

Another method has been applied to multi-carrier communication systems that use a small number of carrier frequencies. In that method all the different possible outputs of each signal 10(1)–10(n) are simulated. For example, if each signal 10(1)–(n) is a 4-ary quadrature amplitude modulated signal, each signal would be one of four different waveforms. If there are ten carrier frequencies, then over a million combinations are simulated. Those combinations of the outputs of signals 10(1)–(n) that exhibit peak to power ratios that exceed a specified limit are not used in actual transmissions. Typically, a channel must be simulated periodically because of changes in the channel's characteristics.

The elimination of some of the possible combinations of the outputs of the signals, however, reduces the bandwidth of the communication scheme. Further, the method can only be applied to communication systems that use a few carriers since the number of simulations required increases exponentially with an increase in the number of carriers. That is, if M-ary QAM and N frequencies are used, $N^M$ combinations must be simulated. M can be as high as 1024 and N even larger. Thus, this method becomes impractical when even a moderate number of carriers are used.

A third method involves performing inverse fast fourier transforms on subsets of the signals 10(1)–(n). For example, an IFFT may be performed on the first one fourth signals, another IFFT for the second one fourth, and etc. The four output signals may then be linearly combined to provide one output signal. Reducing the number of carriers within a single IFFT output reduces the peak to average power ratio for that output signal since there are fewer signal components. The linear combinations are compared to determine which combination has the best PAR.

As the number of signals and carriers increase the number of IFFTs that must be performed on the subsets of the signals increase, according to the number of signals incorporated within a single IFFT. The complexity of the transmitter thereby increases by the number of IFFTs that must be performed, compared to a single IFFT. Further, information about the linear combination of the transmitted signal must also be passed along to the receiver. This information is even more vital, and usually requires additional bandwidth to ensure proper reception and decoding of the information.

In yet another method of reducing peak to average power ratio, the output signal of an IFFT of all the signal components is scaled to bring the peaks below the maximum level. A problem with this solution is that the signal to noise ratio is reduced proportionally with the scaled factor. Reducing the signal to noise creates a great number of other problems which makes this method unattractive. For example, as the signal to noise ratio decreases more errors occur during transmission.

What is desired is a method of reducing the peak to average power ratio of a transmission within a multi-carrier communication system without a significant decrease in the amount of usable bandwidth, and with low complexity such that reduction of the peak to average power ratio may be performed in real time.

SUMMARY OF THE INVENTION

The present inventions provide methods and systems for reducing the peak to average power ratio of a multi-carrier signal. Reducing the peak to average power ratio of a signal ensures that amplifiers and transmitters are not saturated, causing loss of data. Further, reducing peak to average power ratios reduces the consumption of power during transmission.

Peak to average power ratios are reduced by selecting a subset of a plurality of frequencies that make up a multi-carrier symbol. Peak reduction signals, carried at the subset of frequencies, are computed to reduce the PAR of the symbol.

In one embodiment, a kernel is generated that has components in the subset of frequencies. The kernel is adjusted to negate one or more peaks in the multi-carrier symbol. The adjustment of the kernel creates a subset of signals of a plurality of signals centered at the plurality of frequencies. Negation of the peaks may be performed iteratively to remove any peaks produced during prior peak reduction operations.

In one embodiment, the subset of frequencies are chosen prior to transmission. In alternate embodiments, the subset of frequencies may be reselected during communication.

The subset of frequencies may be chosen to obtain a kernel that may better negate the peaks of the multi-carrier symbol. In one embodiment the subset of frequencies may be chosen based upon the characteristics of the channel. In other embodiments, the subset of signals may be chosen randomly, pseudo-randomly, or combinations thereof.

These and other advantages of the present invention will become apparent to those skilled in the art upon a reading of the following descriptions of the invention and a study of the several figures of the drawing.

BRIEF DESCRIPTION OF THE DRAWINGS

FIGS. 10a–c illustrate several approximate impulse functions p(t) in accordance with an embodiment of the present inventions.

FIG. 11 illustrates a multi-carrier transmitter in accordance with an embodiment of the present inventions.

FIG. 13 illustrates a receiver in accordance with an embodiment of the present inventions.

DETAILED DESCRIPTION OF THE PRESENT INVENTIONS

The present inventions provide apparatuses and methods of reducing peak to average power ratios in multi-carrier communication systems without significantly reducing the amount of bandwidth. The present inventions may also be implemented with a low amount of complexity such that they may be implemented in real time. Additionally, no significant amount of side information is required, which would reduce bandwidth, nor is there a reduction in the signal to noise ratio or quality of service.

The present inventions apply to any type of communication systems utilizing multiple carriers. By way of example, the present inventions apply to Discrete Multi-Tone (DMT), Orthogonal Frequency Division Multiplexing (OFDM) and Discrete Wavelet Multi-Tone (DWMT) communication systems.

Figure 1:
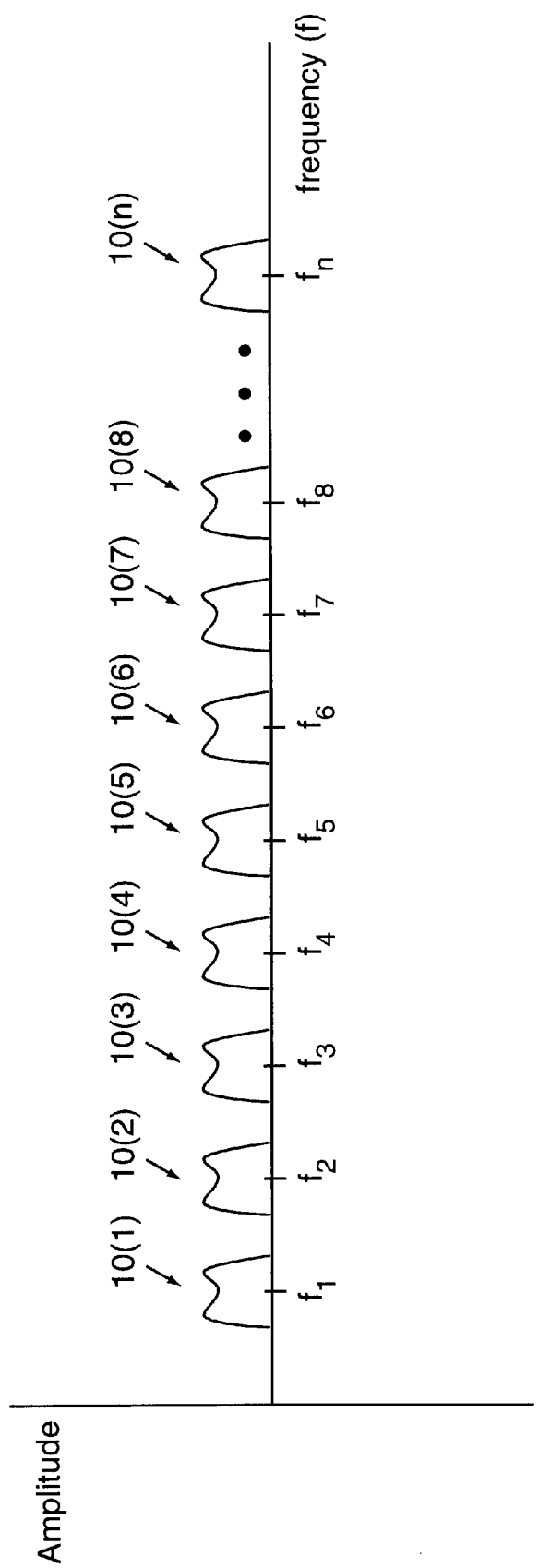
FIG. 1 illustrates a frequency domain plot of several signals of a multi-carrier communication system.
Figure 2:
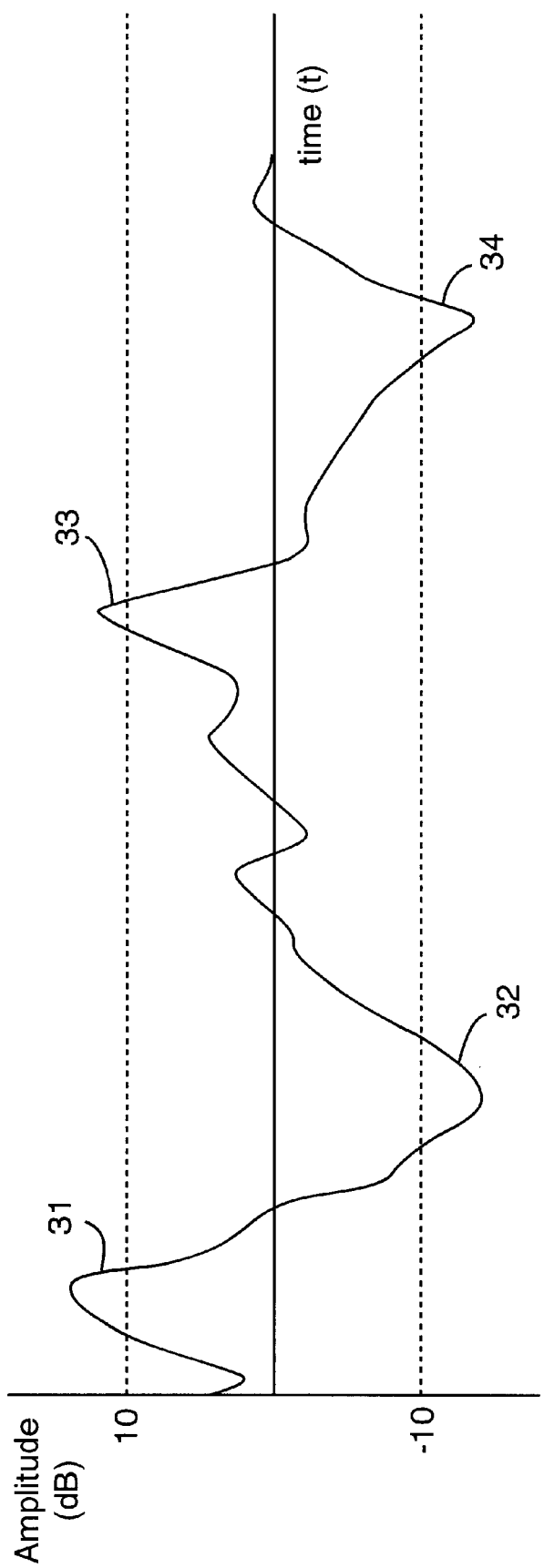
FIG. 2 illustrates a continuous time domain representation of a typical output signal of a multi-carrier transmitter.
Figure 3:
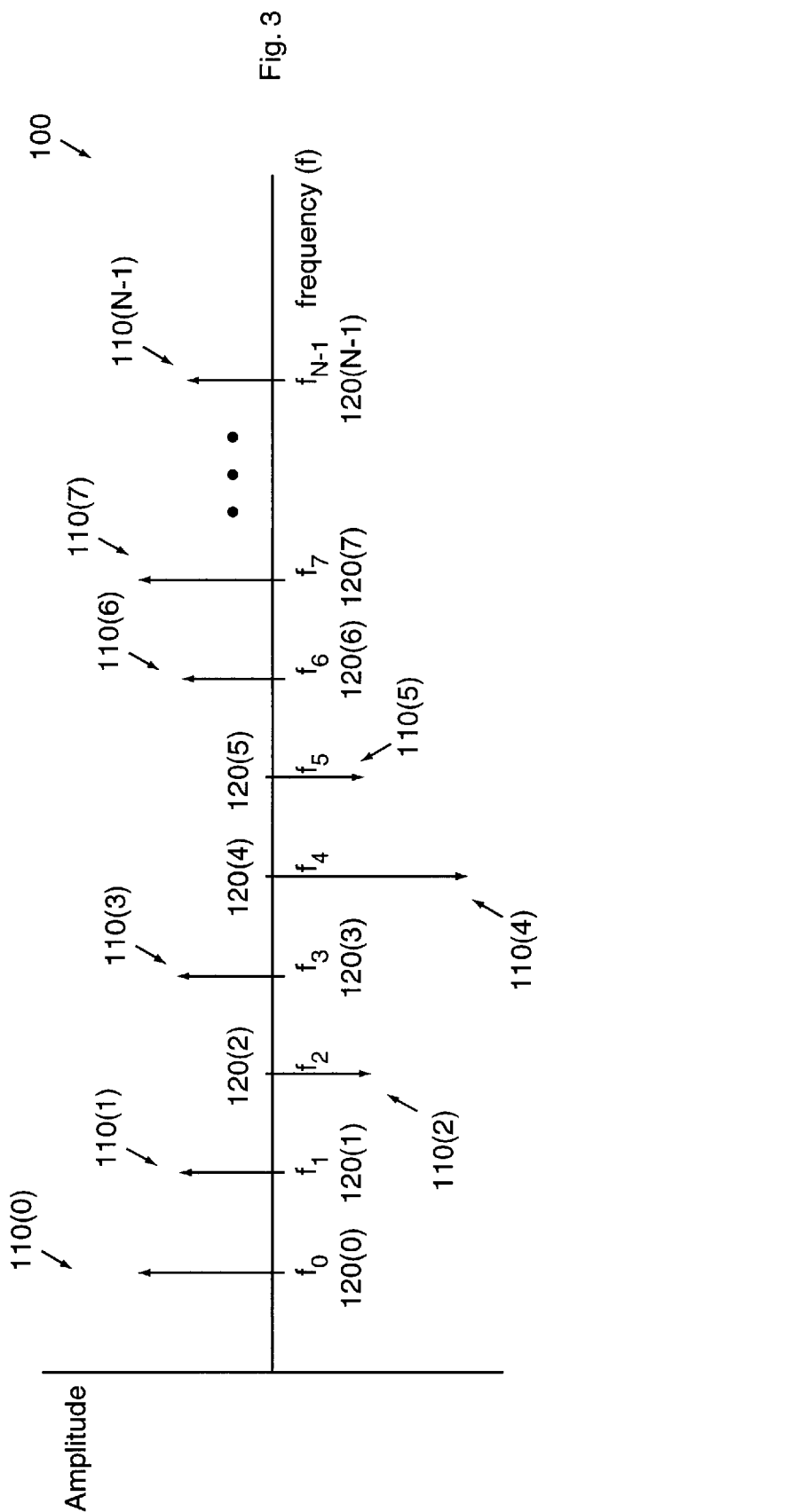
FIG. 3 illustrates a frequency domain plot of a DMT symbol prior to applying an inverse fast fourier transform.

Referring to FIG. 3, a multi-carrier communication system takes advantage of a channel by sending several signals over a wide band of frequencies. FIG. 3 is a frequency domain plot of a DMT symbol 100 prior to applying an inverse fast fourier transform. The DMT symbol is a function of a number of signals 110(0)–110(N−1), each centered at a different frequency 120(0)–(N−1). While details of the present inventions are discussed in terms of a DMT communication system, the advantages of the present inventions: apply readily to other types of multi-carrier communication systems, and the present inventions are not restricted to only DMT systems.

Each signal 120(0)–(N−1) may carry any number of bits of information in a digital system. By way of example, each signal may be modulated by M-ary quadrature amplitude modulation, M-ary phase shift key, frequency modulation, amplitude modulation, continuous phase modulation or any other type of suitable modulation scheme. The illustrated signals are M-ary quadrature amplitude modulated. Thus, each signal 110(0)–(N−1) has a magnitude and a phase in addition to its frequency.

Figure 4:
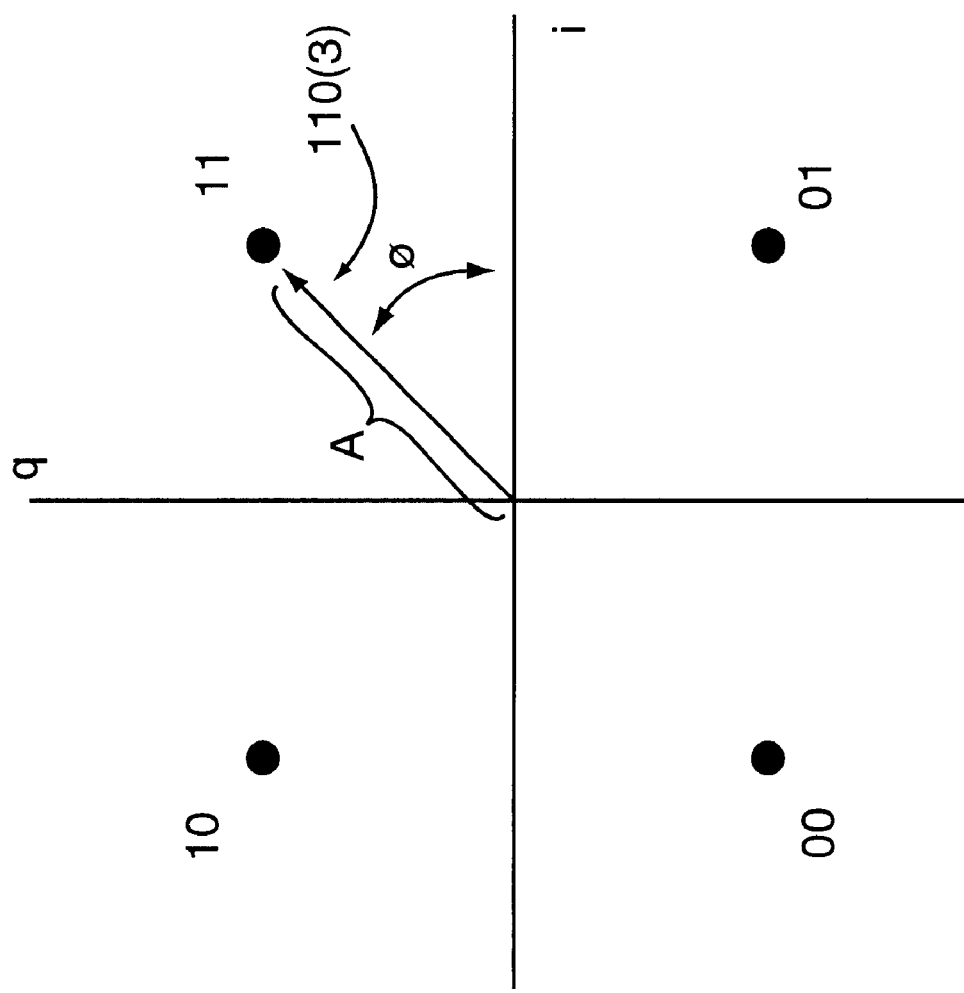
FIG. 4 illustrates a signal constellation of a signal that is 4-ary quadrature amplitude modulated.

FIG. 4 is a signal constellation of signal 110(3) that is 4-ary quadrature amplitude modulated. Signal 110(3) has an amplitude, A, and a phase, ø. Depending upon the amplitude and phase, signal 110(3) may represent one of four binary values, 00, 01, 10 and 11, as illustrated.

Each signal 110(0)–(N−1) are all quadrature amplitude modulated, but may have different constellations. The number of constellation points that a signal represents depends upon the characteristic of the channel for that particular frequency. That is, if frequency 120(4) is less noisy than frequency 120(3), then signal 110(4) may have an 8-ary QAM constellation or greater. Thus, by looking at the characteristics of the channel less noisy frequencies may carry signals that represent a greater number of bits.

In one embodiment of the present inventions, those frequencies that have a lot of noise and are capable of only carrying low bit rate signals are used as peak reduction frequencies. The peak reduction frequencies may carry no signal at all. It has been found that having peak reduction frequencies that carry no signal may sometimes marginally help to reduce the peak to average power ratio of a transmission.

In another embodiment, the peak reduction frequencies carry peak reduction signals. Peak reduction signals, like regular signals, have an amplitude and a phase. However, in one embodiment, the peak reduction signals generally do not carry any data. Rather, the peak reduction signals are scaled and shifted such that the peaks of the output signal are dramatically reduced.

In alternate embodiments of the present inventions, the peak reduction frequencies may be chosen by any suitable method. Frequencies that are noisy are utilized as peak reduction frequencies since the decrease in data rate of the output symbol is minimized. However, a different selection of peak reduction frequencies may provide better peak to average power ratio reduction with fewer peak reduction frequencies. It has been found that randomly selected peak reduction frequencies provides good peak to average power ratio attenuation. Selection of peak reduction frequencies is discussed further below.

Because of the properties of an inverse fourier transform changing the attributes of one or more of the components of a signal before it is inverse fourier transformed effects the transformed signal. In the case of DMT a discrete time signal x is generated from a number of complex valued QAM modulated signals 110(0)–(N–1), or X. Where $$x=[x_1 \ldots x_n \ldots x_N]; \text{ and}$$

$$X=[X_1 \ldots X_n \ldots X_N]$$

The elements of X are complex values that represent the amplitude and phase of the signals $X_0$–$X_{N-1}$, where the frequencies $f_0$–$f_{N-1}$, are of equal bandwidth and separated by 1/T, where T is the time duration of a DMT symbol. Each element of x is a symbol derived from X defined by:

$$x_n = \frac{1}{\sqrt{N}} \sum_{k=0}^{N-1} X_k e^{j2\pi kn/N}, k = 0, \ldots, N-1$$

which can be written as x=QX, where Q is the IFFT matrix and the elements of Q are $$q_{n,k} = \frac{1}{\sqrt{N}} e^{j2\pi kn/N}$$

The peak to average power ratio (PAR) of x is then:

$$PAR = \frac{\|x\|_\infty^2}{\varepsilon[\|x\|_2^2]/N}$$

where $\|v\|_\infty$ is the norm of the vector v, or the maximum absolute value, $v_2$ is the 2-norm of the vector v, or the root mean square, and $\varepsilon[f(v)]$ is the expected value of the function f(v).

The peak reduction frequencies, once chosen, can be assigned arbitrary amplitudes and phases. In one embodiment, the peak reduction frequencies may be initialized with zero amplitude and zero phase. The values for the peak reduction signals are represented as the vector c in the time domain, and C in the frequency domain, where.

$$x+c=Q(X+C)$$

The possible values for c are chosen such that $$PAR = (c^*) = \frac{\min_c \|x+c\|_\infty^2}{\varepsilon[\|x\|_2^2]/N} << \frac{\|x\|_\infty^2}{\varepsilon[\|x\|_2^2]/N}$$

where c* is the optimal solution for c. The value of the right side of the inequality is the PAR of the signal generated from the vector x, and the left side of the inequality is the PAR of the peak reduced signal generated from the vector x+c.

The values for C at the peak reduction frequencies may be any suitable value that helps to reduce the peaks in the transmitted multi-carrier symbol. However, the values for C at the non-peak reduction frequencies are always zero, such that the values of C do not interfere with X. Thus, $$C_k = \begin{cases} C_k, k \in \{i_1, \ldots, i_L\} \\ 0, k \notin \{i_1, \ldots, i_L\} \end{cases}$$

Initially, $C_k$ may be set to zero, and the values for $C_k$ changed later to reduce the PAR. L is the number of peak reduction frequencies that are utilized to reduce the PAR of x. If N frequencies are available, then the ratio of peak reduction frequencies to the overall number of frequencies is L/N. However, the actual bandwidth loss is the number of bits that the peak reduction frequencies were capable of carrying over the total number of bits that all N frequencies are capable of carrying. By selecting peak reduction frequencies that are capable of carrying few, or zero, bits per symbol, bandwidth loss is minimized. The non-zero values, Ck for k ∈ $\{i_1 \ldots, i_L\}$ or Ĉ, are called the peak reduction signals, or peak reduction tones in the case of DMT, or more generally dummy signals.

Figure 5:
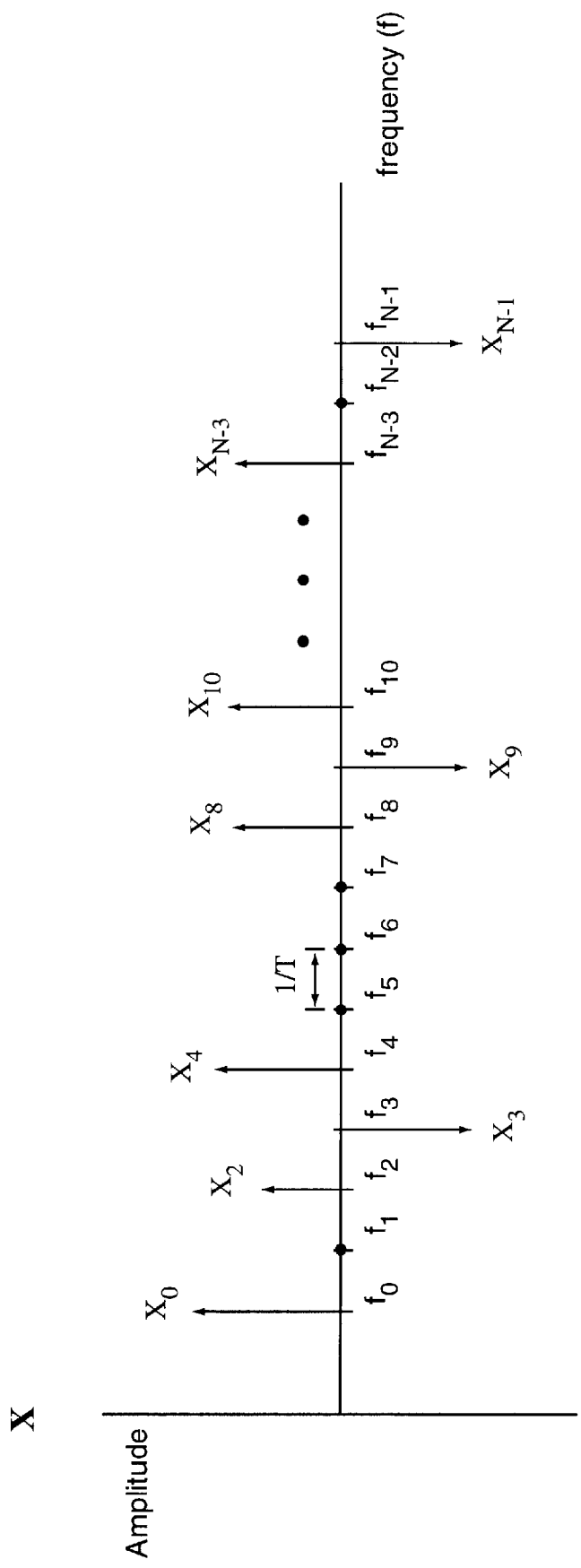
FIG. 5 illustrates a frequency domain representation of X in accordance with an embodiment of the present inventions.
Figure 6:
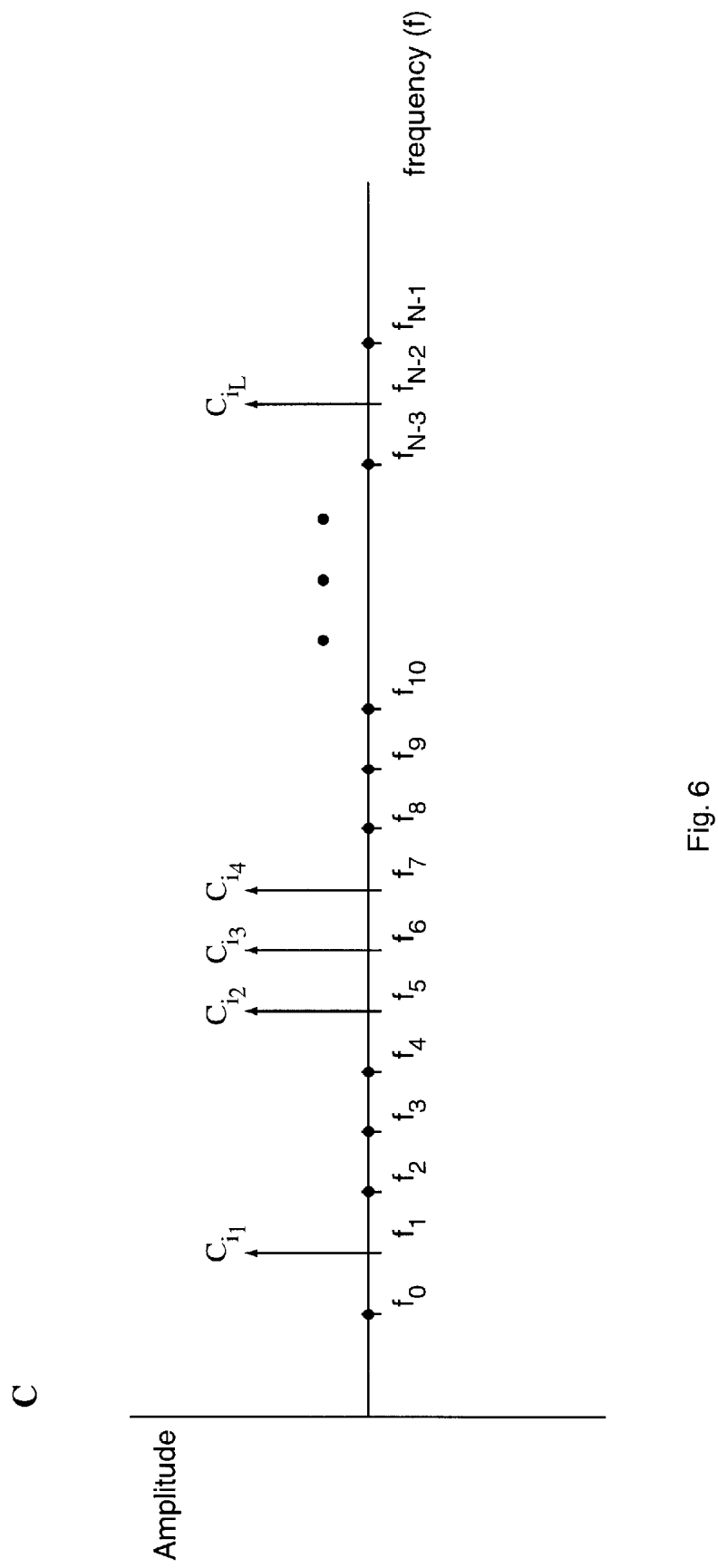
FIG. 6 illustrates the frequency domain representation of C in accordance with an embodiment of the present inventions.

The values for X are zeroed out at the peak reduction frequencies. FIGS. 5 and 6 show the frequency domain representations of X and C, respectively, according to one embodiment of the present inventions. The frequencies $f_1$, $f_5$, $f_6$, $f_7$ and $f_{N-2}$ are chosen as peak reduction frequencies. Accordingly, the values for $X_1$, $X_5$, $X_6$, $X_7$ and $X_{N-2}$ are zero. The other values for X correspond to the amplitude and phase of those signals.

In alternate embodiments, only one component of the values of X may be zeroed out and used for peak reduction purposes. By way of example, the real part of the values of $X_1$, $X_5$, $X_6$, $X_7$ and $X_{N-2}$ may be zeroed out and the imaginary part of the components used to carry information. Analogously, one of the phase or amplitude components of the values of X may be zeroed out and used for peak reduction while the other is used to carry information.

The values for C correspond to the peak reduction frequencies. The index i conforms to the peak reduction frequencies, e.g., $i_1$ is the index for the first peak reduction frequency $f_1$, $i_2$ is the index for the second peak reduction frequency $f_5$, and etc.

Figure 7:
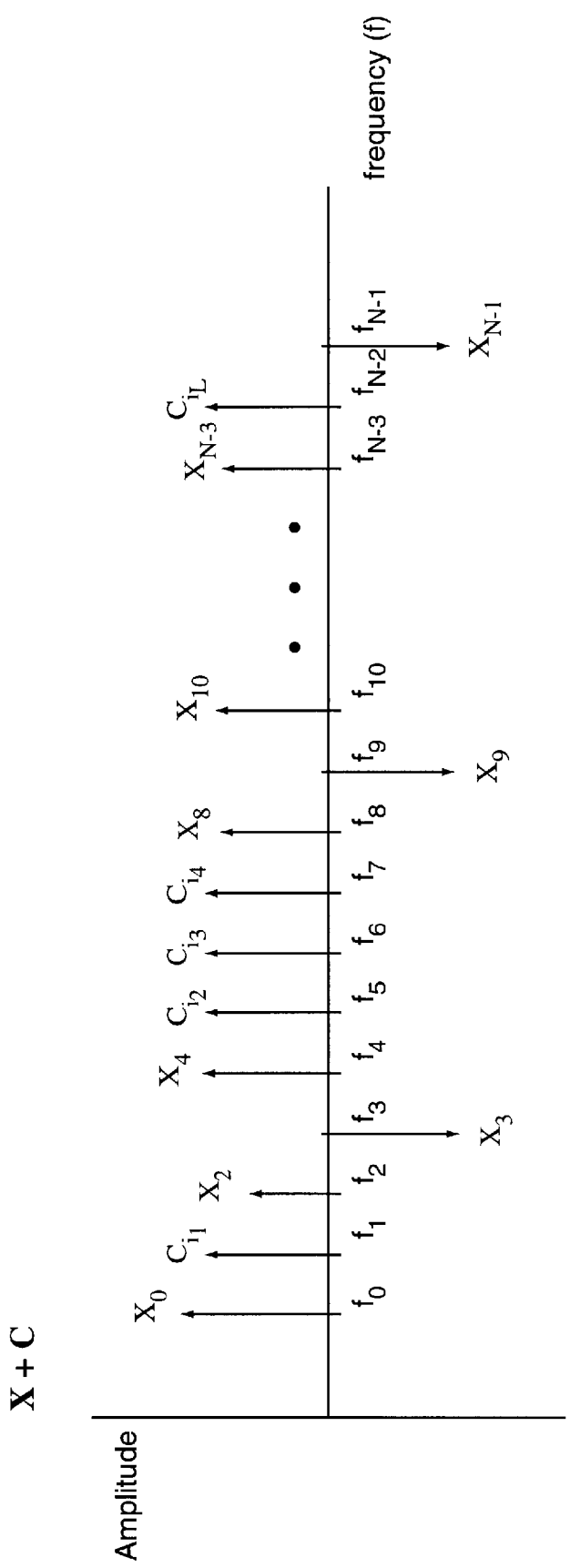
FIG. 7 illustrates the frequency domain representation of X+C in accordance with one embodiment of the present inventions.

FIG. 7 illustrates the frequency domain representation of X+C, in accordance with one embodiment of the present inventions. In the combined signal all the frequencies contain a signal. The non-zero values of peak reduction signals C are located at the peak reduction frequencies, while the actual signals X are located at the non-peak reduction frequencies. Initially, the peak reduction signals C may have any arbitrary values. However, it is useful to initialize the values of C at zero.

Figure 8:
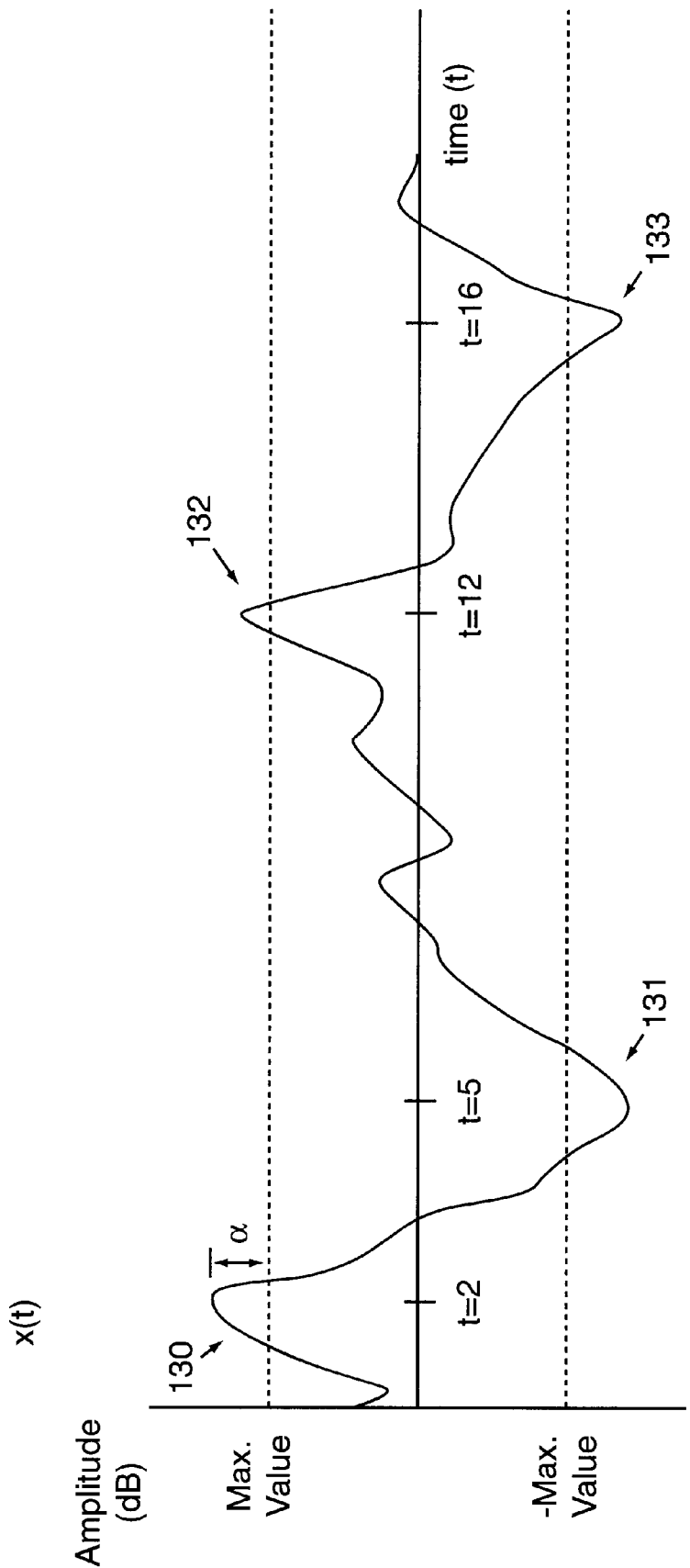
FIG. 8 illustrates the continuous time domain representation of a symbol signal x(t) of a multi-carrier communication system in accordance with an embodiment of the present inventions.
Figure 9:
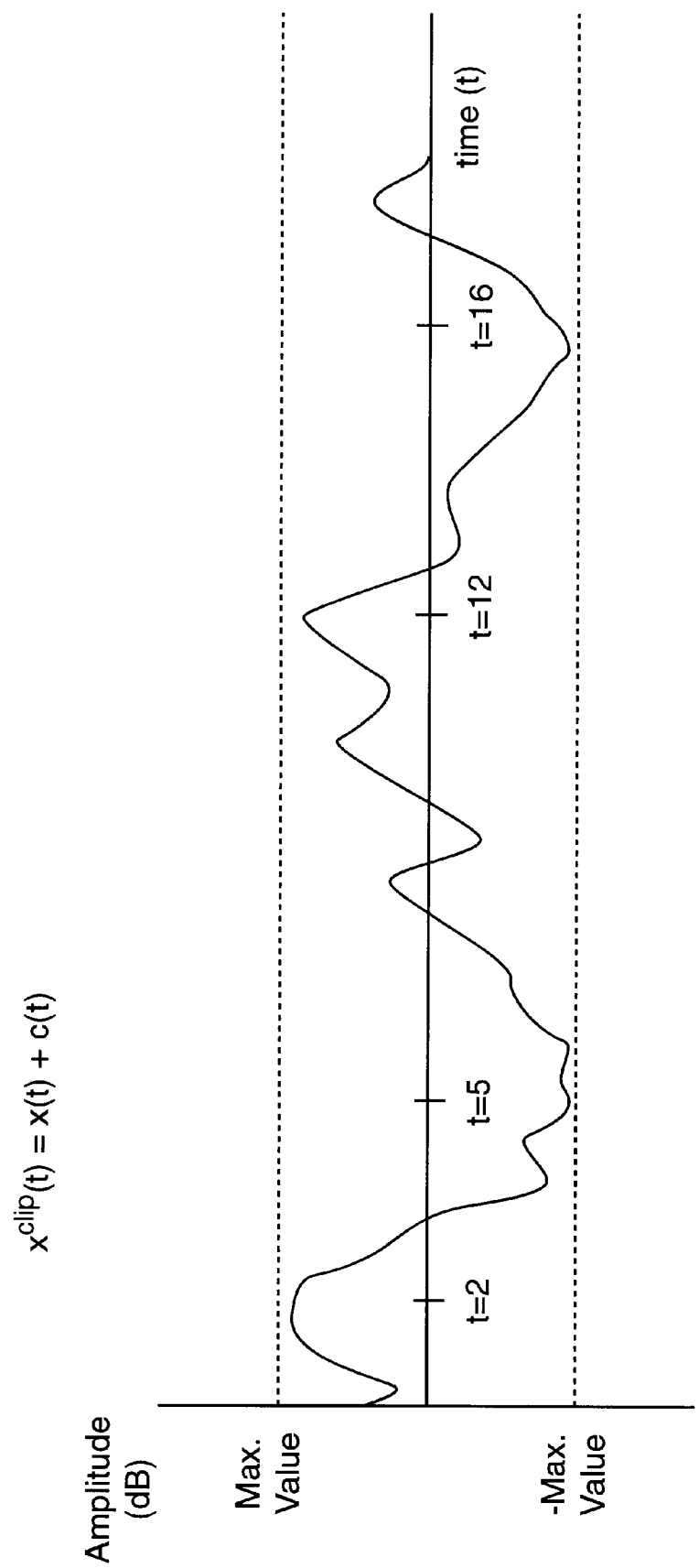
FIG. 9 illustrates a time domain representation of a desired symbol signal $x^{clip}(t)=x(t)+c(t)$ in accordance with an embodiment of the present inventions.

The first set of values of C may then be represented as the initial values C(0). If C(0) are zeroes, then X+C(0) =X, and x+c(0)=x. The time domain representation of x+c(0) is equivalent to the unmodified signal x(t), as illustrated in FIG. 8. However, the values for C should be chosen to provide a signal (x+c) that does not have peaks that exceed a predetermined magnitude. FIG. 9 is a time domain representation of a desired signal $x^{clip}(t)=x(t)+c(t)$ generated by the vector x+c.

The continuous time domain waveforms depicted in FIGS. 8, 9 and other figures are representative of analogous discrete time domain waveforms. A majority of the algorithms used in the present inventions are predominantly performed in discrete time due to practical considerations. The continuous time domain waveforms are used for purposes of illustration. However, the scope of the present inventions includes analogous algorithms performed in continuous time and frequency domains.

The values for C* and c*, the optimal solution that would provide an $x^{clip}(t)$ with the smallest PAR, may be obtained by solving the following equation:

$$\min_{c}\|x+c\|_{\infty} = \min_{\hat{c}}\|x+\hat{Q}\hat{C}\|_{\infty}$$

$\hat{Q}$ is the sub-matrix of Q constructed from the columns $i_1, \ldots, i_L$, and $\hat{C}$ represents the non-zero values of C. c* can actually be solved through linear programming. Solutions may also be found separately for the real and the imaginary parts of x or X.

The above equation may be rewritten in the following form:

$$\min_{\hat{c}} t$$
$$\text{subject to } x + \hat{Q}\hat{C} \leq_N t1_N,$$
$$x + \hat{Q}\hat{C} \geq_N -t1_N$$

Moving all the unknowns to the left hand side, the equations may be rewritten as:

$$\min_{\hat{c}} t$$
$$\text{subject to } \hat{Q}\hat{C} - t1_N \leq_N -x, \text{ or}$$
$$\hat{Q}\hat{C} + t1_N \geq_N -x$$

$$\min_{\hat{c}} t$$
$$\text{subject to } \begin{pmatrix} \hat{Q} & -1_N \\ -\hat{Q} & -1_N \end{pmatrix}\begin{pmatrix} \hat{C} \\ t \end{pmatrix} \leq_{2N} \begin{pmatrix} -x \\ x \end{pmatrix}$$

The linear program has 2L+1 unknowns {Real($\hat{C}$), Imag($\hat{C}$), t} and 2N inequalities written in the standard linear program form:

min $c^T x$ subject to $Ax \leq_N b$

Linear programming algorithms exist to solve for c*. The linear programming solutions provide the ideal solution c*. Currently, the exact solution approach is most practical in communication systems operating at data rates of approximately 500 kbps or lower because of the amount of computations required to compute the exact solution for c*. However, good approximations of c* may be obtained such that the PAR of x can be satisfactorily reduced in real time for higher data rate systems. However, as processing power becomes more readily available in the future the linear programming solution may be utilized in multi-carrier communication systems operating at higher speeds in accordance with the present inventions.

Approximating c, C

As seen in FIG. 8, the time domain signal x(t) has several peaks 130–133. The peaks 130–133 can be reduced by adding or subtracting an appropriately scaled impulse function $\delta(t)$ at those peak time values. The impulse function, however, must be constructed from the peak reduction frequencies, $\{i_1, i_2, \ldots, i_L\}$. Since a true impulse function cannot be created by less than all the frequency components, i.e., when L<N, an approximate impulse must be used, p.

FIGS. 10a–c illustrate several approximate impulse functions p(t), generated from different values of p, in accordance with one embodiment of the present inventions. Since only the L peak reduction frequencies can be used to create the approximate impulse function p(t), or kernel, p(t) is not ideal. One useful constraint that may be placed upon p(t) is that the value for p(0) is equal to one. This allows p(t) to be scaled more readily.

FIG. 10a may be a first approximation of an impulse. The lobes around the impulse should however be reduced in magnitude. The side lobes should be reduced to ensure that when the impulse is applied to x(t) to clip a particular peak no other portion of x(t) exceed the maximum value. Another approximation of an impulse may look like the approximation in FIG. 10b. Obviously, the secondary peaks of FIG. 10b poses a problem when applied to x(t). Ideally, p(t) should resemble the waveform depicted in FIG. 10c.

Solving for the mean square error between p=$\hat{Q}$ $\hat{P}$ and an ideal discrete time impulse $e_0=[1\ 0\ \ldots\ 0]^T$ provides the solution for an approximation of p that is the mean square error. The mean square error minimizes the sum of all the peaks of the kernel, or power, other than the peak at p(0).

$$\hat{P}_2^b = \arg\min_{\hat{p}}\|\hat{Q}\hat{P} - e_0\|_2^2,$$

$$P_2^b = \hat{Q}\hat{P}_2^b$$

The solution becomes:

$$\hat{P}_2^b = (\hat{Q}^T\hat{Q})^{-1}\hat{Q}^T e_0 = \hat{Q}^T e_0 = \frac{1}{\sqrt{N}}[1\ldots 1]^T = \frac{1}{\sqrt{N}}1_L$$

$$P_2^b = \frac{1}{\sqrt{N}}\hat{Q}1_L$$

Since the value for $p_o$ should be equal to one we can scale the result to obtain the mean square error optimal solution for p, p*.

$$\hat{P}_2^* = \frac{\sqrt{N}}{L}1_L$$

$$P_2^* = \frac{\sqrt{N}}{L}\hat{Q}1_L$$

Since P has non-zero values only at the peak reduction frequencies, C may be represented as any suitable linear combination of P. The linear combinations of P correspond to the scaled and shifted versions of the kernel, p, such that the scaled and shifted versions of p negate the peaks of x. For example, if p(t) of FIG. 10c were to be applied to x(t) of FIG. 8, p(t) would be inverted and shifted to t=2 in order to cancel out the first peak 130. Also, if the first peak 130 exceeded the maximum value by some factor $\alpha$, p(t–2) would be scaled by a value greater than $\alpha$, such as (1.2$\alpha$). When x(t) and (1.2$\alpha$)p(t–2) are added the value at t=2 would be the maximum value +$\alpha$–1.2$\alpha$, which gives us a value less than the maximum value (maximum value –0.2$\alpha$). The scaling and time shifting of p merely scales and phase shifts the values of P, and therefore $\hat{C}$. $\hat{C}$, which is a linear combination of P, will have zero values at the non-peak reduction frequencies.

Any number of peaks may be clipped in this fashion in one iteration. However, reducing one or more peaks may cause the resulting waveform to exceed the maximum value at other positions. Therefore, the process may be repeated with the resulting $x^{clip}$+c to achieve a new $x^{clip}$ with a PAR that is satisfactory.

In order to minimize the second highest peak of p(t), thereby reducing all the peaks other than the peak at p(0), a linear program may be used to solve for the infinite norm equation.

$$\hat{P}_\infty^* = \underset{\hat{P}}{\arg\min} \|[p_1 p_2 \ldots p_{N-1}]\|_\infty^2, \text{ subj. to } p_0 = 1$$

$$p_\infty^* = \hat{Q}\hat{P}_\infty^*$$

$p^*_\infty$ provides the optimal solution, producing a p(t) that resembles the waveform illustrated in FIG. 10c.

The solution of p regardless of its order may be computed in advance, or off-line, since only the peak reduction frequencies need to be known. Thus, p may be predetermined once the peak reduction frequencies have been chosen. Once p is known, p may be linearly combined in any fashion to produce the necessary values for c and C. The resulting c is a good approximation of c* depending upon the number of iterations performed.

In one embodiment, the choice of the peak reduction frequencies may be based upon obtaining a good kernel, p. Once the number of peak reduction frequencies, L, has been determined, the location of the peak reduction frequencies may be determined based upon deriving a good, or the best, kernel, p. Certain quality factors may be imposed before accepting a p as a valid kernel. By way of example, a p with secondary peaks greater than a predetermined magnitude may be rejected. That set of peak reduction frequencies may then be rejected and a new set of peak reduction frequencies selected to provide a better p.

It has been found that randomly selected peak reduction frequencies will often times provide a good kernel. If a first set of peak reduction frequencies chosen randomly does not provide a good kernel, a new selection of peak reduction frequencies that swap a subset of the first randomly chosen peak reduction frequencies sometimes provides a better kernel. The combinations of peak reduction frequencies may be iteratively evaluated until a kernel with the appropriate characteristics is obtained.

In another embodiment, peak reduction frequencies may be chosen based upon the bit rates of the frequencies. In one instance, a pseudo-random selection of the peak reduction frequencies may be performed with weights applied to those frequencies that have low bit rates that make the selection of those frequencies more likely. If after several iterations a proper kernel, p, cannot be obtained the weights may be adjusted since the weighted frequencies may not be good candidates for constructing a proper kernel.

After the peak reduction frequencies have been chosen the optimal, or a good approximation of the optimal kernel is computed. Using the resulting kernel, p, the peak reduction vector c, containing the peak reduction signals, or peak reduction signals, may be constructed. Initially, the vector x+c(0), where the values of c(0) is all zeroes, is computed by taking the IFFT of the vector X, containing zero values in the peak reduction frequencies. If only one peak is negated during a single iteration of applying the kernel, p, is performed $X^{clip}(1)=x+c(1)$, where $c(1)=A_1 p[(n-\Delta_1)]_N$ in the discrete time domain, where is A a scaling factor and Δ is a time shift. If two peaks are canceled in one iteration $x^{clip}(1)=x+c(1)$, where $c(1)=A_1p(n-\Delta_1)+A_2p(n-\Delta_2)$, and so on.

Any number of peaks may be canceled in a single iteration. Obviously, canceling more peaks requires more computations per iteration without being able to readily determine if the multiple application of several scaled and/or shifted kernels have not introduced newly created peaks. Thus, in one embodiment, it may be advantageous to limit the number of peaks per iteration. Once an iteration is complete the kernels may be linearly combined to produce c(j), where j is the current iteration. After computing c(j) and adding it to x, the new $x^{clip}$, $x^{clip}(j)$, can be reevaluated to determine if further peaks require cancellation.

Further iterations may be performed by taking the previous $x^{clip}$ and adding another set of values for c, i.e., $x^{clip}(j)=x^{clip}(j-1)+c(j)$. Since the values of x remain the same because p and P are only functions of the peak reduction frequencies this sum expands to $$x^{clip}(j) = x + c(0) + c(1) + \ldots + c(j-1) + c(j), \text{ or}$$

$$c^{clip}(j) = x + \sum_{m=0}^{j} c(m), \text{ and}$$

$$c^* = \sum_{m=0}^{j} c(m) \text{ as } j \to \infty$$

The sum of c's is equal to a number of scaled and/or shifted kernels, p. If only one peak is corrected (only one peak is canceled) per iteration then the equation becomes:

$$x^{clip}(j) = x + A_1 p[(n-\Delta_1)]_N + A_2 p[(n-\Delta_2)]_N + \ldots +$$
$$A_{j-1} p[(n-\Delta_{j-1})]_N + A_j p[(n-\Delta_j)]_N, \text{ or}$$

$$x^{clip}(j) = x + \sum_{m=0}^{j} A_m p[(n-\Delta_m)]_N$$

Thus, c is computed simply by performing multiplies and adds, and does not require any additional transforms, which are significantly more computationally intensive. Thus, the present inventions require significantly fewer computational resources than other methods that have been used to reduce the PAR of a multi-carrier signal.

The process may be repeated indefinitely until the summation of c approaches the optimal peak reduction signal vector c*. But a good approximation of c* may be obtained in as little as one or two iterations. The quality of c depends upon the quality of the kernel p, which depends upon the number and location of the peak reduction frequencies. Thus, as L, the number of peak reduction frequencies increases towards N, the total number of frequencies, better approximations of c* are obtained in fewer iterations.

By way of example, four iterations at one kernel application per iteration when the ratio of L/N is 5% has produced good results. Application of the present inventions with higher L/N ratios have produces better results with fewer iterations.

In alternative embodiments, discussed further below, it be helpful to know the values of C once c has been computed. In those cases a fourier transform of c provides the values for C. Since c does not contain any frequency components in the non-peak reduction frequencies the fourier transform of the entire signal x+c need not be computed. Further, if operations are performed on C in order to provide better performance or added functionality the inverse fourier transform of C may be taken to obtain a new c. The new c can be added to x to provide the new $x^{clip}$. Again, the inverse transform of X is not needed. Thus, even when additional transforms are utilized the transformation operations are simpler than transforming the entire signal.

Once $x^{clip}$ is determined it is transmitted to a receiver. The receiver, or demodulator, decodes $x^{clip}$. A fourier transform is performed on the decoded signal. The values of the peak reduction signals at the peak reduction frequencies are discarded since they typically do not carry any information. The values of $X_{received}$ are then further decoded to extract the information carried by those multiple carriers.

In alternate embodiments, the peak reduction signals may include some type of additional information. In those embodiments the peak reduction signals, $C_{received}$, are also decoded.

FIG. 11 illustrates a multi-carrier transmitter. in accordance with an embodiment of the present inventions. Transmitter 200 includes an encoder 202, modulator 204, kernel applicator 206 and a digital to analog converter 208. Encoder 202 receives a stream of digital data and encodes the data such that it can be transmitted over several different carriers. The encoder 202 provides the segmented data to modulator 204. Modulator 204 modulates the segmented data using an appropriate modulation scheme, such as QAM. The individually modulated signals are combined together. as a vector to produce a single frequency domain signal, X. Certain predetermined frequencies, peak reduction frequencies, are not used.

Modulator 204 provides the frequency domain signal, X, to kernel applicator 206. Kernel applicator 206 performs an inverse fourier transform to X to obtain x, which also modulates the signals to the frequencies $f_0-f_{N-1}$. Kernel applicator 206 adds peak reduction signals, c, to x in order to reduce the PAR of x. Initially, the peak reduction frequencies and a kernel are predetermined, as discussed above. The choice of peak reduction frequencies, in one embodiment, may be based upon the characteristics of the channel. In alternate embodiments, the frequencies are chosen purely randomly, randomly with weights applied to frequencies with low bit rates, according to channels that are not utilized by the particular communication system, or any other suitable method.

Once kernel applicator 206 has finished reducing the peak to average power ratio of the signal x, it provides x as another symbol of the discrete time sequence, $x^{clip}(n)$ to digital to analog converter (DAC) 208. DAC 208 converts the discrete time signal to a continuous time domain signal $x^{clip}(t)$. The DAC may also include filters or other signal processing components.

The waveform of $x^{clip}(t)$ has peaks that predominantly does not exceed a predetermined maximum magnitude. Currently, it is desirable to limit the peaks of $x^{clip}(t)$ to below 8–12 dB. However, the present inventions may provide better PAR reduction depending upon the number of peak reduction frequencies and iterations. By way of example, with a L/N ratio of 20% the PAR of a signal may be reduced to about 6 dB or lower within a finite number of iterations. With proper peak to average power ratio reduction $x^{clip}(t)$ resembles the waveform illustrated in FIG. 9 as opposed to the waveform illustrated in FIG. 8, which represents x(t) without the application of a kernel.

Figure 12:
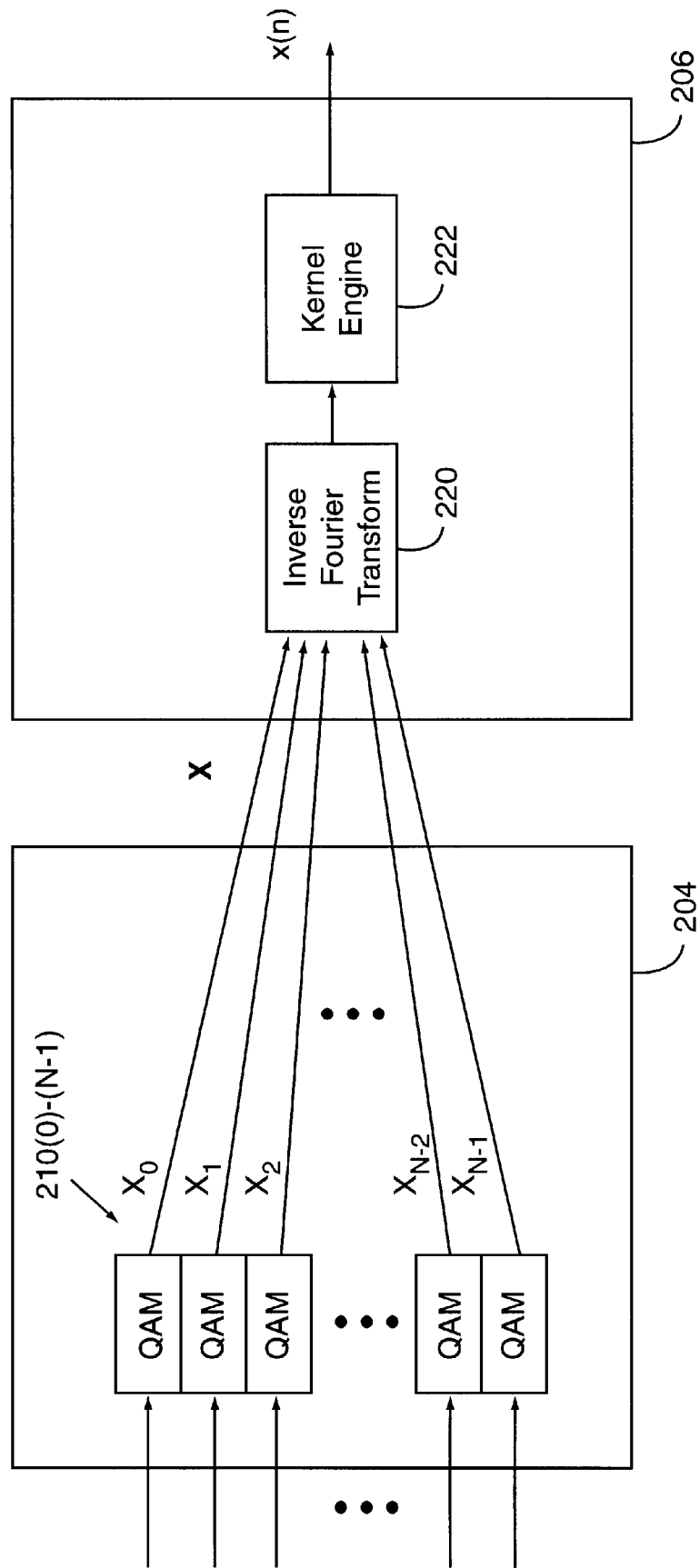
FIG. 12 illustrates block diagrams of the modulator and the kernel applicator of FIG. 11 in accordance with an embodiment of the present inventions.

FIG. 12 illustrates block diagrams of modulator 204 and kernel applicator 206 of FIG. 11 in accordance with an embodiment of the present inventions. Encoder 202 segments the data and provides the data to modulator 204. Modulator 204 includes a number of modulators 210(0)–(N-1). Modulator 204 modulates the separate data streams with modulators 210(0)–(N-1). Modulators 210(0)–(N-1) modulate the individual data streams by the appropriate modulation scheme.

In the illustrated embodiment the data streams are modulated by an M-ary QAM scheme. However, any suitable type of modulation scheme may be utilized in accordance with the present inventions. The output of modulators 210(0)–(N-1) provide the components of X, $X_1-X_N$.

In an alternate embodiment, modulator 204 may also modulate the data segments to the frequencies $f_0-f_{N-1}$. The modulated signals may be summed to produce x. This type of modulation does not require an inverse fourier transform to obtain x, and x is directly fed to the kernel applicator.

Selection of the peak reduction frequencies are made in advance. The modulators 210(0)–(N-1) corresponding to the peak reduction frequencies do not receive data from encoder 202. Rather, the peak reduction modulators are set to an initial value, such as zero amplitude and phase.

Inverse fast fourier transformer (IFFT) 220 transforms X to provide the discrete time equivalent x. IFFT 220 passes x to kernel engine 222, which applies a kernel to discrete time equivalent x. The particular kernel is also computed beforehand based upon the selection of the peak reduction frequencies. The kernel engine 222 analyzes x to determine how the kernel should be scaled and time delayed to remove the peaks in x. The scaled and delayed kernel is added to x resulting in $x^{clip}=x+c$. c is a linear combination of one or more kernels that have been scaled and time delayed to negate one or more peaks in x. Kernel engine 222 outputs $x^{clip}$ as part of the overall discrete time data stream x(n).

The value of c may result from one iteration of applying one or more kernels to x. Alternatively, c may be accumulated over several iterations of applying the kernel to x. Iteration is useful because the first iteration may negate the original peaks of x, but may also create other peaks due to the imperfection of the kernel.

In the illustrated embodiment, more than one iteration of applying a kernel to x is performed. Kernel engine 222 provides the values of c(j), the newest linear combination of the kernel. In one embodiment c(j) may be the accumulated linear combination including past iterations of applying the kernel. If no further iterations are necessary x+c is provided to DAC 208.

Once DAC 208 converts the discrete time signal into a continuous time signal, the continuous time signal may be transmitted to a receiver through a channel. Again, DAC 208 may perform additional filtering and signal processing.

FIG. 13 illustrates a receiver in accordance with an embodiment of the present inventions. Receiver 300 includes a FFT 302, a demodulator 304 and a decoder 306. Before FFT 302 receives the received signal $x_r(t)$, the received signal may have been passed through filtering and/or other signal processing. The received signal may also be converted from analog to digital, providing a discrete time domain received signal $x_r(n)$.

FFT 302 applies a fourier transform to the received signal to produce $X_r$, which is provided to demodulator 304, and $C_r$. $X_r$ provides the values of the data signals centered at the non-peak reduction frequencies of $f_0-f_N$. The elements of $X_r$ are further decoded to extract the data carried by those signals.

$C_r$ is typically discarded if the peak reduction signals do not carry any information and are not further decoded. However, in alternate embodiments where $C_r$ does carry some type of information those components of the received signal may be decoded as well.

In one embodiment, a number of band pass filters centered at frequencies $f_0-f_N$ are applied to $X_r$ to extract the different frequency components of $X_r$. Individual demodulators then demodulate the band passed signals to extract the separate data streams. The data streams are recombined to reproduce the original data stream.

Figure 14:
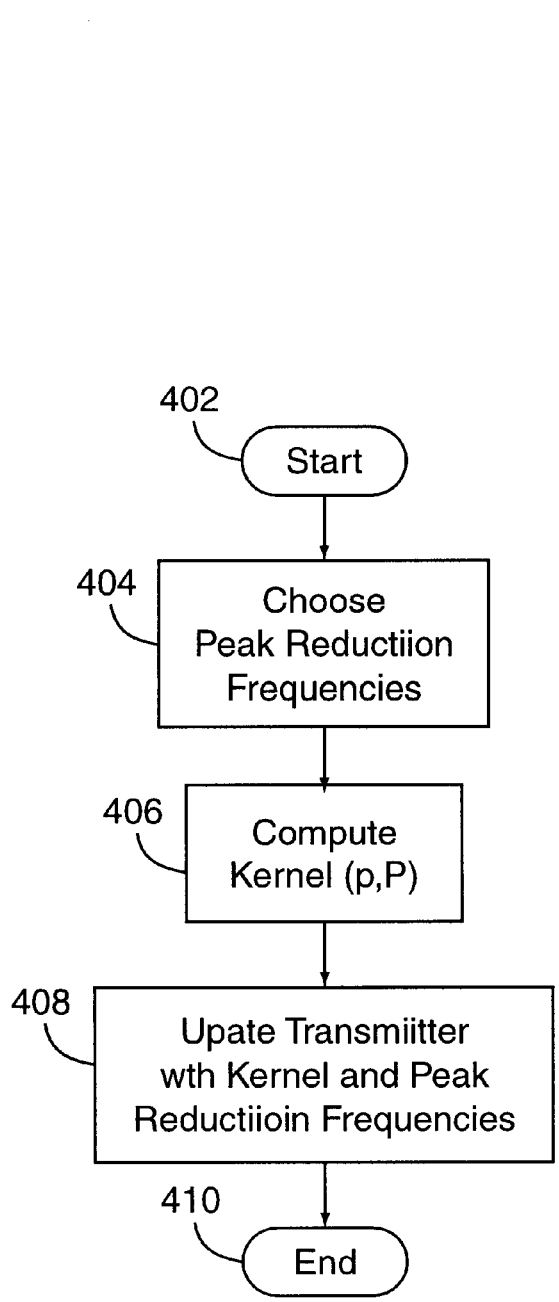
FIG. 14 illustrates the preliminary process of determining the peak reduction channels in accordance with an embodiment of the present inventions.
Figure 15:
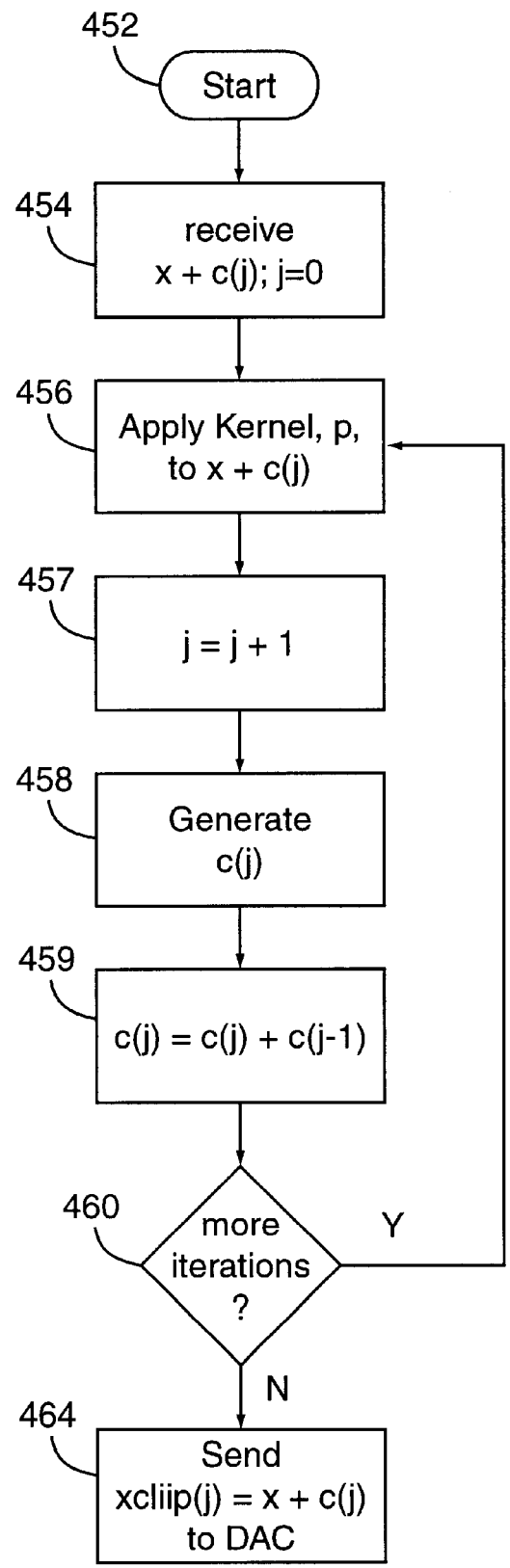
FIG. 15 illustrates a flow chart of the operation of the kernel engine. of FIG. 12 in accordance with an embodiment of the present inventions.

FIGS. 14 and 15 illustrate flow charts describing the process applying a kernel. FIG. 14 illustrates the preliminary process of determining the peak reduction channels. Flow-chart 400 begins at block 402 and proceeds to block 404. In block 404 the peak reduction frequencies are chosen. The peak reduction frequencies may be chosen based upon the characteristics of the channel. As described, frequencies that are capable of handling low bit rates, or no communication at all, may be chosen as peak reduction frequencies.

In an alternative embodiment, the peak reduction frequencies may be chosen randomly. Alternatively, the frequencies may be chosen pseudo-randomly with weights applied to the low bit rate frequencies to make their selection more likely. Higher frequencies tend to be noisier frequencies in many applications and the peak reduction channels may be chosen primarily in the higher frequencies. But, in many cases peak reduction frequencies that are sequentially grouped may provide less PAR reduction than randomly selected peak reduction frequencies. The choice of peak reduction frequencies should, however, be made in light of obtaining a sufficient kernel to perform adequate PAR reduction.

The number of peak reduction frequencies compared to the number of overall frequencies is also determined. A greater number of peak reduction frequencies provides better performance. However, as the number of peak reduction frequencies increases more bandwidth is lost to the peak reduction signals. Thus, a tradeoff must be made between performance and bandwidth. A ratio of peak reduction frequencies to overall frequencies of about 5% has been found to provide good performance while minimizing the loss of bandwidth. However, any suitable ratio may be used depending upon the needs of the system.

Proceeding to block 406 a kernel is computed from the chosen peak reduction frequencies. The above described algorithm may be used to compute a best approximation of an impulse. The computation of the kernel may also be performed by linear programming. In block 408 the chosen peak reduction frequencies and the computed kernel are applied to the relevant parts of the transmitter. By way of example, the encoder and modulator are configured to modulate data at the non-peak reduction frequencies. The kernel information is supplied to the kernel engine. The flow chart ends in block 410.

FIG. 15 illustrates a flow chart 450 of the operation of kernel engine 222 of FIG. 12. The flow chart 450 begins in block 452 and proceeds to block 454. In block 454 x is received from IFFT 220. Initially, IFFT 220 provides a peak reduction component, c(0), that is zeroed out.

In block 456 the kernel engine analyzes x+c(j) and applies one or more kernels to x+c(j) to reduce any peaks. In the first pass $x^{clip}(j)=x+c(j)$; j=0. The kernel engine may negate one, two, or as many peaks as desired in one iteration. However, the more peaks that are canceled in a single iteration the more computation that is required. A tradeoff may be made based upon the available computational resources and the need for better performance.

In block 457 the index j is incremented. Proceeding to block 458 the kernel engine translates the scaling and shifting of the kernel into values for co). In block 459 the new peak reduction components are accumulated by adding the previous peak reduction components; c(j)=(j)+c(j−1).

The kernel engine determines whether more iterations are required in block 460. If no other iterations are required the current $x^{clip}(j)=x+c(j)$, is passed on to DAC 208, where c(j) is the accumulated sum of all the iterations of applying the kernel. When further iterations are required, flow proceeds to back to block 456.

The operations of flow chart 400 of FIG. 14 may be performed before any transmissions occur. The operations may also be performed periodically during transmission as well. Whenever the characteristics of the channel changes new peak reduction frequencies may be chosen, and a new kernel calculated. The transmitter may be updated on the fly, without significantly interrupting communications.

Of course, the receiver must know which frequencies are peak reduction frequencies. That information is transmitted to the receiver before communications with a new set of peak reduction frequencies begin. The information about the identity of the peak reduction frequencies is small and does not significantly affect the bandwidth of communications. The peak reduction frequencies information is also intermittent, occurring rarely. By way of example, peak reduction frequencies may be chosen in increments of minutes, hours, days, weeks, months or years, depending upon the stability of the channel. Even if re-selection of the peak reduction frequencies occurs every few minutes, the data would not prohibitively burden the bandwidth of the communication system. In many applications the selection of peak reduction frequencies and a corresponding kernel need only be computed once, during initialization of a communication system.

The operations of the transmitter may be performed by discrete components or more general purpose devices. By way of example, a digital signal processor may perform any or all of the functions of the encoder, modulator, and the kernel applicator. However, more specialized devices may provide better performance.

In certain situations the average distribution of energy may be higher in the peak reduction frequencies than the non-peak reduction frequencies. To alleviate this potential concern a repeating pattern of peak reduction frequencies and kernels may be used for success symbols transmitted. A first symbol would use one set of peak reduction frequencies, a second symbol would use another set of peak reduction frequencies, and repeating after the last set of peak reduction frequencies has been used. The receiver would also be informed in advance of the different sets of peak reduction frequencies and synchronized. In this alternate embodiment average energy is more evenly distributed over all the frequencies. Switching between different sets of peak reduction frequencies may also be performed for other reasons besides energy distribution.

The PAR is a time-varying quality and fluctuates per symbol that is transmitted, which depends upon various factors. At times when the PAR of a particular symbol is low the PAR reduction may be turned off for that symbol. This frees up the peak reduction frequencies to carry data. For example, when the PAR is below 10 dB PAR reduction is turned off for that symbol. When the PAR becomes a problem the peak reduction frequencies may then be used for peak reduction. In addition, the number of peak reduction frequencies may. be varied depending upon the conditions. Informing the receiver requires very little additional information and does not take up a significant amount of the overall bandwidth of the system.

In a further embodiment, different sets of peak reduction frequencies, and corresponding kernels, are precalculated. During the analysis of a symbol a selection of one of the sets of peak reduction frequencies may be made based upon which set provides the best PAR reduction. Of course, the selection of one of the sets must be transmitted to the symbol, however the bandwidth required for sending the information is low in comparison to other PAR reduction schemes.

As mentioned the peak reduction signals may be used in alternate ways. By way of example, the peak reduction signals may be used for peak reduction and carry information. In embodiments where the peak reduction and data signals include more than one component, e.g., an amplitude and a phase value, or a real and an imaginary value, one of the two values may be used specifically for peak reduction while the other may be used to carry information. In such embodiments a set of kernels may be computed for increment of delay, rather than one kernel that is shifted. This removes one dimension of variability in the peak reduction signals such that a single component of the peak reduction frequencies may be used for peak reduction and the other component used for other purposes.

The present inventions are not limited to the application of a kernel to cancel the peaks of a multi-carrier symbol or signal. Algorithms that do not require the application of a kernel may be utilized to adjust the values carried at the peak reduction frequencies to reduce the PAR of a symbol or signal. By way of example, iteratively performing the FFT and IFFT of the peak reduced signal per iteration may be substituted for applying a kernel. Linear programming may also be utilized to solve for the peak reduction signals.

The peak reduction signals also contain information about the original signal x. The information carried by the peak reduction signals informs the receiver exactly how the original signal was clipped. The receiver may be able to use this information for signal processing purposes to help decode the different component s of the received signals.

While these inventions have been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A transmitter for use in a multi-carrier communication system, wherein a symbol transmitted by the transmitter has a peak to average power ratio and is a function of a plurality of signals, each one of the plurality of signals being centered at one of a plurality of frequencies, wherein the transmitter comprises:

an applicator for configuring a subset of the plurality of signals to reduce the peak to average power ratio before the symbol is transmitted, wherein the subset contains signals that do not carry data, and wherein each signal of the subset of the plurality of signals is centered at a frequency in the subset of the plurality of frequencies, and wherein the subset of the plurality of frequencies facilitates the reduction of the peak to average power ratio; and a kernel applicator for applying a kernel to the symbol, wherein the applicator configures the subset of the plurality of signals by applying the kernel to the symbol, the kernel being a function of the subset of the plurality of frequencies, such that the subset of the plurality of signals are determined by the application of the kernel to the symbol;

wherein the symbol has a peak, further wherein the applicator adjusts the kernel to provide an adjusted kernel which is applied to the peak by the kernel applicator.

2. The transmitter of claim 1, wherein the symbol has a plurality of peaks, further wherein the applicator repeatedly adjusts the kernel to provide a plurality of adjusted kernels which are applied to the plurality of peaks by the kernel applicator.

3. The transmitter of claim 1, wherein the symbol has a peak, further wherein the applicator scales the kernel and the kernel applicator applies the scaled kernel to the symbol to reduce the peak, whereby one or more signal of the subset of the plurality of signals is modified.

4. The transmitter of claim 1, wherein the symbol has a peak, further wherein the applicator time shifts the kernel and the kernel applicator applies the time shifted kernel to the symbol to reduce the peak, whereby one or more signal of the subset of the plurality of signals is modified.

5. The transmitter of claim 1, wherein the symbol has a peak, further wherein the applicator phase shifts the kernel and the kernel applicator applies the phase shifted kernel to the symbol to reduce the peak, whereby one or more signal of the subset of the plurality of signals is modified.

6. A transmitter for use in a multi-carrier communication system, wherein a symbol transmitted by the transmitter has a peak to average power ratio and is a function of a plurality of signals, each one of the plurality of signals being centered at one of a plurality of frequencies, wherein the transmitter comprises:

an applicator for configuring a subset of the plurality of signals to reduce the peak to average power ratio before the symbol is transmitted, wherein the subset contains signals that do not carry data, and wherein each signal of the subset of the plurality of signals is centered at a frequency in the subset of the plurality of frequencies, and wherein the subset of the plurality of frequencies facilitates the reduction of the peak to average power ratio; and a kernel applicator for applying a kernel to the symbol, wherein the applicator configures the subset of the plurality of signals by applying the kernel to the symbol, the kernel being a function of the subset of the plurality of frequencies, such that the subset of the plurality of signals are determined by the application of the kernel to the symbol;

wherein the kernel has a primary peak and a secondary peak each peak having an amplitude, the amplitude of the secondary peak being smaller than the amplitude of the primary peak, further wherein the subset of the plurality of frequencies minimizes the amplitude of the secondary peak with respect to the amplitude of the primary peak.

7. The transmitter of claim 6, wherein the kernel has a primary peak having an amplitude and a plurality of secondary peaks, each of the secondary peaks having an amplitude, each of the amplitudes of the secondary peaks being smaller than the amplitude of the primary peak, further wherein the subset of the plurality of frequencies minimizes each of the amplitudes of the plurality of secondary peaks with respect to the amplitude of the primary peak.

8. A transmitter for use in a multi-carrier communication system, wherein a symbol transmitted by the transmitter has a peak to average power ratio and is a function of a plurality of signals, each one of the plurality of signals being centered at one of a plurality of frequencies, wherein the transmitter comprises:

an applicator for configuring a subset of the plurality of signals to reduce the peak to average power ratio before the symbol is transmitted, wherein the subset contains signals that do not carry data, and wherein each signal of the subset of the plurality of signals is centered at a frequency in the subset of the plurality of frequencies, and wherein the subset of the plurality of frequencies facilitates the reduction of the peak to average power ratio;

further comprising a kernel applicator for applying a kernel to the symbol, wherein the symbol has a plurality of peaks, further wherein the applicator configures the subset of the plurality of signals by applying the kernel to the symbol, the kernel being a function of the subset of the plurality of frequencies, further wherein the applicator adjusts the kernel to provide a first adjusted kernel and the kernel applicator applies the first adjusted kernel to a first one of the plurality of peaks and further wherein the applicator adjusts the kernel to provide a second adjusted kernel and the kernel applicator applies the second adjusted kernel to a second one of the plurality of peaks.

9. A transmitter for use in a multi-carrier communication system, wherein a symbol transmitted by the transmitter has a peak to average power ratio and is a function of a plurality of signals, each one of the plurality of signals being centered at one of a plurality of frequencies, wherein the transmitter comprises:

an applicator for configuring a subset of the plurality of signals to reduce the peak to average power ratio before the symbol is transmitted, wherein the subset contains signals that do not carry data;

a fourier transformer; and an inverse fourier transformer, wherein the applicator configures the subset of the plurality of signals by modifying the subset of the plurality of signals and the fourier transformer applies a fourier transform to the subset of the plurality of signals and incorporates the fourier transformed subset into the plurality of signals, the inverse fourier transformer then applying an inverse fourier transform to the plurality of signals and determining if the subset of the plurality of signals requires more modification, wherein the fourier transformer and the inverse fourier transformer repeat their functions if the subset of the plurality of signals requires more modification.

10. A multi-carrier communication system comprising:

a transmitter that transmits a symbol, wherein the symbol has a peak to average power ratio and is a function of a plurality of signals, each one of the plurality of signals being centered at one of a plurality of frequencies, wherein the transmitter comprises an applicator for configuring a subset of the plurality of signals, the subset containing signals that do not carry data, the applicator configuring the subset of the plurality of signals to reduce the peak to average power ratio, wherein the transmitter includes:

an encoder, wherein the encoder encodes a first set of data into a plurality of sets of data;

a modulator, coupled to the encoder, that receives the plurality of sets of data and modulates each set of data of the plurality of sets of data to produce the plurality of signals, wherein the signals of the plurality of signals are combined; and a kernel applicator, coupled to the modulator, wherein the kernel applicator reduces the peak to average power ratio of the combined plurality of signals by modifying one or more signals of the subset of the plurality of signals, and producing the symbol, whereby the peak to average power ratio of the symbol is reduced.

11. The multi-carrier communication system of claim 10 wherein the modulator modulates the plurality of sets of data at the plurality of frequencies.

12. The multi-carrier communication system of claim 10, wherein the kernel applicator includes:

an inverse fourier transformer, coupled to the modulator, the inverse fourier transformer performing an inverse fourier transform on the combined plurality of signals producing a transformed signal; and a kernel engine, coupled to the inverse fourier transformer, wherein the kernel engine analyzes the transformed signal and detects any peaks in the transformed signal, if a peak is detected the kernel engine applies a kernel to the peak of the transformed signal by adjusting the kernel, wherein the kernel is an approximation of an impulse generated from the subset of the plurality of signals, such that the kernel is adjusted by modifying the subset of the plurality of signals, whereby the peak to average power ratio of the symbol is reduced.

13. A multi-carrier communication system comprising:

a transmitter that transmits a symbol, wherein the symbol has a peak to average power ratio and is a function of a plurality of signals, each one of the plurality of signals being centered at one of a plurality of frequencies, further wherein the transmitter comprises means for selecting a subset of the plurality of signals, the subset containing signals that do not carry data, and means for configuring the subset of the plurality of signals to reduce the peak to average power ratio, wherein each signal in the subset of signals is centered at a frequency in a subset of the plurality of frequencies, further wherein the selecting means selects the subset of the plurality of frequencies from the plurality of frequencies to facilitate the reduction of the peak to average power ratio such that the peak to average power ratio is below a predetermined value, wherein a kernel applicator configures the subset of the plurality of signals by applying a kernel to the symbol, the kernel being a function of the subset of the plurality of frequencies, such that the subset of the plurality of signals are determined by the application of the kernel to the symbol.

14. The multi-carrier communication system of claim 13, wherein the kernel applicator determines the subset of the plurality of signals by a linear program based upon the subset of the plurality of frequencies.

15. The multi-carrier communication system of claim 13, the transmitter further comprising a fourier transformer coupled to the kernel applicator and a modulator, wherein a kernel engine determines the subset of the plurality of signals by modifying the subset of the plurality of signals and the fourier transformer applying a fourier transform to the subset of the plurality of signals, which are then incorporated into the plurality of signals by the modulator and an inverse fourier transformer applying an inverse fourier transform to the plurality of signals and the kernel applicator determining if the subset of the plurality of signals require more modification, and repeating if the subset of the plurality of signals require more modification.

16. The multi-carrier communication system of claim 13, wherein the symbol has a peak, such that a kernel engine scales and applies the kernel to the symbol to reduce the peak, whereby a one or more signal of the subset of the plurality of signals is modified.

17. The multi-carrier communication system of claim 13, wherein the symbol has a peak, such that a kernel engine time shifts and applies the kernel to the symbol to reduce the peak, whereby a one or more signal of the subset of the plurality of signals is modified.

18. The multi-carrier communication system of claim 13, wherein the symbol has a peak, such that a kernel engine phase shifts and applies the kernel to the symbol to reduce the peak, whereby a one or more signal of the subset of the plurality of signals is modified.

19. The multi-carrier communication system of claim 13, wherein the kernel has a primary and a secondary peak each peak having an amplitude, the secondary peak having a smaller amplitude than the amplitude of the primary peak, such that the subset of the plurality of frequencies is chosen from the plurality of frequencies such that the amplitude of the secondary peak are minimized with respect to the amplitude of the primary peak.

20. The multi-carrier communication system of claim 13, wherein the kernel has a primary peak having an amplitude and a plurality of secondary peaks, each of the secondary peaks having an amplitude, each amplitude of the secondary peaks being smaller than the amplitude of the primary peak, such that the subset of the plurality of frequencies is chosen from the plurality of frequencies such that each amplitude of the secondary peaks is minimized with respect to the amplitude of the primary peak.

21. A multi-carrier communication system comprising:
   a transmitter that transmits a symbol, wherein the symbol has a peak to average power ratio and is a function of a plurality of signals, an each one of the plurality of signals being centered at an each one of a plurality of frequencies, a subset of the plurality of signals configured to reduce the peak to average power ratio, the subset of signals are centered at a subset of the plurality of frequencies, and the subset of the plurality of frequencies is chosen from the plurality of frequencies to facilitate the reduction of the peak to average power ratio configured such that the peak to average power ratio is below a predetermined value wherein the symbol has a plurality of peaks, and the subset of the plurality of signals are configured by applying a kernel to the symbol, the kernel being a function of the subset of the plurality of frequencies, such that the subset of the plurality of signals are determined by the application of the kernel to the symbol by a kernel applicator, the application of the kernel including a kernel engine adjusting the kernel to provide a first adjusted kernel and applying the first adjusted kernel to a first one of the plurality of peaks and adjusting the kernel to provide a second adjusted kernel and applying the second adjusted kernel to a second one of the plurality of peaks.

22. A method of reducing a peak to average power ratio of a symbol of a multi-carrier communication system, wherein the symbol is a function of a plurality of signals, each signal of the plurality of signals centered at one of a plurality of frequencies, the method comprising:
   selecting a subset of the plurality of frequencies, whereby a corresponding subset of the plurality of signals also is selected, wherein the signals in the subset of the plurality of signals are peak reduction signals that do not carry data; and
   modifying a signal in the subset of the plurality of signals such that the peak to average power ratio of the symbol of the multi-carrier communication system is reduced.

23. The method of claim 22, wherein modifying the subset of the plurality of signals include:
   scaling one or more signal of the subset of the plurality of signals.

24. The method of claim 22, wherein modifying the subset of the plurality of signals includes:
   phase shifting one or more signal of the subset of the plurality of signals.

25. The method of claim 22, wherein modifying the subset of the plurality of signals includes:
   time shifting one or more signal of the subset of the plurality of signals.

26. The method of claim 22, wherein selecting the subset of the plurality of frequencies is based upon optimizing a kernel to approximate an impulse function, the kernel being a function of a plurality of components, each one of the plurality of components centered at one frequency of the subset of the plurality of frequencies, such that the plurality of components is a part of the subset of the plurality of signals, whereby optimizing the kernel facilitates reducing the peak to average power ratio.

27. A method of reducing a peak to average power ratio of a symbol of a multi-carrier communication system, wherein the symbol is a function of a plurality of signals, each signal of the plurality of signals centered at one of a plurality of frequencies, the method comprising:
   selecting a subset of the plurality of frequencies, whereby a corresponding subset of the plurality of signals also is selected, wherein the signals in the subset of the plurality of signals are peak reduction signals, wherein selecting the subset of the plurality of frequencies is based upon optimizing a kernel to approximate an impulse function, the kernel being a function of a plurality of components, each one of the plurality of components centered at one frequency of the subset of the plurality of frequencies, such that the plurality of components is a part of the subset of the plurality of signals, whereby optimizing the kernel facilitates reducing the peak to average power ratio; and
   modifying a signal in the subset of the plurality of signals such that the peak to average power ratio of the symbol of the multi-carrier communication system is reduced;
   further wherein the basis for selecting the subset of the plurality of frequencies is selected in part on the basis of a selection method chosen from the group of:
   a random process;
   a channel which the multi-carrier communication system uses as a medium of communication, and
   bit rates of the frequencies in the plurality of frequencies, wherein each frequency in the plurality of frequencies has a bit rate that depends upon channel which the multi-carrier communication system uses as a medium of communication.

28. A method of reducing a peak to average power ratio of a symbol of a multi-carrier communication system, wherein the symbol is a function of a plurality of signals, each signal of the plurality of signals centered at one of a plurality of frequencies, the method comprising:
   selecting a subset of the plurality of frequencies, whereby a corresponding subset of the plurality of signals also is selected, wherein the signals in the subset of the plurality of signals are peak reduction signals, wherein selecting the subset of the plurality of frequencies is based upon optimizing a kernel to approximate an impulse function, the kernel being a function of a plurality of components, each one of the plurality of components centered at one frequency of the subset of the plurality of frequencies, such that the plurality of components is a part of the subset of the plurality of signals, whereby optimizing the kernel facilitates reducing the peak to average power ratio; and modifying a signal in the subset of the plurality of signals such that the peak to average power ratio of the symbol of the multi-carrier communication system is reduced, wherein modifying the subset of the plurality of signals includes:
applying the kernel to the symbol, the kernel being a function of the subset of the plurality of frequencies, such that the subset of the plurality of signals are determined by the application of the kernel to the symbol, wherein if the symbol has a peak, the kernel is scaled and applied to the symbol to reduce the peak, whereby a one or more signals of the subset of the plurality of signals is modified.

29. The method of claim 28, wherein the symbol has a plurality of peaks, and the step of applying the kernel to the symbol is repeated such that the kernel is repeatedly adjusted and applied to the plurality of peaks.

30. The method of claim 28, wherein the kernel is time shifted and applied to the symbol to reduce the peak, whereby the one or more signals of the subset of plurality of signals is modified.

31. The method of claim 28, wherein the symbol has a peak, such that the kernel is phase shifted and applied to the symbol to reduce the peak, whereby the one or more signals of subset of the plurality of signals is modified.

32. A method of reducing a peak to average power ratio of a symbol of a multi-carrier communication system, wherein the symbol is a function of a plurality of signals, each signal of the plurality of signals centered at one of a plurality of frequencies, the method comprising:
selecting a subset of the plurality of frequencies, whereby a corresponding subset of the plurality of signals also is selected, wherein the signals in the subset of the plurality of signals are peak reduction signals, wherein selecting the subset of the plurality of frequencies is based upon optimizing a kernel to approximate an impulse function, the kernel being a function of a plurality of components, each one of the plurality of components centered at one frequency of the subset of the plurality of frequencies, such that the plurality of components is a part of the subset of the plurality of signals, whereby optimizing the kernel facilitates reducing the peak to average power ratio; and
modifying a signal in the subset of the plurality of signals such that the peak to average power ratio of the symbol of the multi-carrier communication system is reduced, wherein the kernel has a primary peak and a secondary peak each peak having an amplitude, the amplitude of the secondary peak being smaller than the amplitude of the primary peak, such that the subset of the plurality of frequencies is chosen from the plurality of frequencies such that the amplitude of the secondary peak is minimized with respect to the amplitude of the primary peak.

33. A method of reducing a peak to average power ratio of a symbol of a multi-carrier communication system, wherein the symbol is a function of a plurality of signals, each signal of the plurality of signals centered at one of a plurality of frequencies, the method comprising:
selecting a subset of the plurality of frequencies, whereby a corresponding subset of the plurality of signals also is selected, wherein the signals in the subset of the plurality of signals are peak reduction signals, wherein selecting the subset of the plurality of frequencies is based upon optimizing a kernel to approximate an impulse function, the kernel being a function of a plurality of components, each one of the plurality of components centered at one frequency of the subset of the plurality of frequencies, such that the plurality of components is a part of the subset of the plurality of signals, whereby optimizing the kernel facilitates reducing the peak to average power ratio; and
modifying a signal in the subset of the plurality of signals such that the peak to average power ratio of the symbol of the multi-carrier communication system is reduced, wherein the kernel has a primary peak having an amplitude and a plurality of secondary peaks, each of the plurality of secondary peaks having an amplitude, each of the amplitudes of the plurality of secondary peaks being smaller than the amplitude of the primary peak, such that the subset of the plurality of frequencies is chosen from the plurality of frequencies such that the each of the amplitudes of the plurality of secondary peaks is minimized with respect to the amplitude of the primary peak.

34. A method of reducing a peak to average power ratio of a symbol of a multi-carrier communication system, wherein the symbol is a function of a plurality of signals, each signal of the plurality of signals centered at one of a plurality of frequencies, the method comprising:
selecting a subset of the plurality of frequencies, whereby a corresponding subset of the plurality of signals also is selected, wherein the signals in the subset of the plurality of signals are peak reduction signals, wherein selecting the subset of the plurality of frequencies is based upon optimizing a kernel to approximate an impulse function, the kernel being a function of a plurality of components, each one of the plurality of components centered at one frequency of the subset of the plurality of frequencies, such that the plurality of components is a part of the subset of the plurality of signals, whereby optimizing the kernel facilitates reducing the peak to average power ratio; and
modifying a signal in the subset of the plurality of signals such that the peak to average power ratio of the symbol of the multi-carrier communication system is reduced, wherein the symbol has a plurality of peaks, and the subset of the plurality of signals are configured by applying the kernel to the symbol, such that the subset of the plurality of signals is determined by the application of the kernel to the symbol, the application of the kernel including adjusting the kernel to provide a first adjusted kernel and applying the first adjusted kernel to a first one of the plurality of peaks and adjusting the kernel to provide a second adjusted kernel and applying the second adjusted kernel to a second one of the plurality of peaks.

35. A method of reducing a peak to average power ratio of a symbol of a multi-carrier communication system, wherein the symbol is a function of a plurality of signals, each signal of the plurality of signals centered at one of a plurality of frequencies, the method comprising:
selecting a subset of the plurality of frequencies, whereby a corresponding subset of the plurality of signals also is selected, wherein the signals in the subset of the plurality of signals are peak reduction signals that do not carry data; and
modifying a signal in the subset of the plurality of signals such that the peak to average power ratio of the symbol of the multi-carrier communication system is reduced, wherein the modifying of the subset of the plurality of signals is repeated, such that the peak to average power ratio of the symbol of the multi-carrier communication system is further reduced.

36. The method of claim 28, wherein the modifying of the plurality of signals is repeated in the range of about one time to about twenty times.

37. The method of claim 22, wherein the ratio between the subject of the plurality of signals and the plurality of signals is about 1:20.

38. The method of claim 22, wherein the ratio between the subset of the plurality of signals and the plurality of signals is chosen from the range of about 1:30 to about 1:2.

39. The method of claim 22, wherein modifying the subset of the plurality of signals includes modifying the subset of the plurality of signals with a linear program based upon the subset of the plurality of frequencies.

40. A method of reducing a peak to average power ratio of a symbol of a multi-carrier communication system, wherein the symbol is a function of a plurality of signals, each signal of the plurality of signals centered at one of a plurality of frequencies, the method comprising:

selecting a subset of the plurality of frequencies, whereby a corresponding subset of the plurality of signals also is selected, wherein the signals in the subset of the plurality of signals are peak reduction signals that do not carry data; and modifying a signal in the subset of the plurality of signals such that the peak to average power ratio of the symbol of the multi-carrier communication system is reduced, wherein modifying the subset of the plurality of signals includes:

modifying the subset of the plurality of signals, applying a fourier transform to the subset of the plurality of signals, incorporating the fourier transformed subset of the plurality of signals into the plurality of signals, applying an inverse fourier transform to the plurality of signals, determining if the subset of the plurality of signals requires more modification, and repeating modifying the subset of the plurality of signals if the subset of the plurality of signals requires more modification.

* * * * *

UNITED STATES PATENT AND TRADEMARK OFFICE
CERTIFICATE OF CORRECTION

PATENT NO. : 6,424,681 B1
DATED : July 23, 2002
INVENTOR(S) : Tellado et al.

It is certified that error appears in the above-identified patent and that said Letters Patent is hereby corrected as shown below:

<u>Title page,</u>
Item [75], Inventors, "Jose Tellado, Mountain View" should read -- Stanford --.

<u>Column 1,</u>
Line 21, "equally spaced. apart." should read -- equally spaced apart. --.

<u>Column 4,</u>
Line 22, "present inventions: apply" should read -- present inventions apply --.
Line 26, "Each signal 120(0)-(N-1)" should read -- Each signal 110(0)-(N-1) --.

<u>Column 5,</u>
Line 42, "is the norm" should read -- is the ∞ norm --.
Line 43, "$v_2$" should read -- $\|v\|_2$ --.

<u>Column 7,</u>
Line 28, insert -- or -- between the equations.
Line 39, "subject to $Ax \leqq N\ b$" should read -- subject to $Ax \leq_N b$ --.

<u>Column 8,</u>
Line 19, " $= \underset{p}{argmin}$ " should read --$= \underset{p}{arg\ min}$ --.

<u>Column 9,</u>
Line 4, "$= \underset{p}{argmin}$" should read --$\underset{p}{arg\ min}$--.

Line 27, "be rejected.." should read -- be rejected. --.

<u>Column 10,</u>
Line 14, "$c^{clip}(j)$" should read -- $x^{clip}(j)$ --.
Line 50, "ratios have produces" should read -- ratios have --.
Line 52, "it be helpful" should read -- it would be helpful --.

<u>Column 11,</u>
Line 8, "multi-carrier transmitter. in" should read -- multi-carrier transmitter in --.

UNITED STATES PATENT AND TRADEMARK OFFICE
CERTIFICATE OF CORRECTION

PATENT NO.    : 6,424,681 B1
DATED         : July 23, 2002
INVENTOR(S)   : Tellado et al.

It is certified that error appears in the above-identified patent and that said Letters Patent is hereby corrected as shown below:

Column 14,
Line 7, "with anew set" should read -- with a new set --.
Line 52, "frequencies may. be varied" should read -- frequencies may be varied --.

Column 15,
Line 26, "the different component s of" should read -- the different components of --.

Column 19,
Line 14, "secondary peak are minimized" should read -- secondary peak is minimized --.
Line 37, "predetermined value wherein" should read -- predetermined value, wherein --.
Line 65, "plurality of signals include:" should read -- plurality of signals includes: --.

Column 21,
Line 20, "whereby the one or more signals of the subset of plurality" should read -- whereby the one or more signals of the plurality --.
Line 24, "whereby the one or more signals of subset" should read -- whereby the one or more signals of the subset --.

Signed and Sealed this

Fourteenth Day of October, 2003

JAMES E. ROGAN
*Director of the United States Patent and Trademark Office*